US012242617B2

(12) United States Patent
Cho

(10) Patent No.: US 12,242,617 B2
(45) Date of Patent: *Mar. 4, 2025

(54) SYSTEM AND METHOD FOR ANALYZING VULNERABILITY IN SOFTWARE INSTALLED ON IOT DEVICE

(71) Applicant: ZIEN, INC., Seoul (KR)

(72) Inventor: Young Min Cho, Incheon (KR)

(73) Assignee: ZIEN, INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,057

(22) Filed: May 23, 2024

(65) Prior Publication Data

US 2024/0403441 A1    Dec. 5, 2024

(30) Foreign Application Priority Data

May 31, 2023    (KR) .................. 10-2023-0069993
Feb. 7, 2024    (KR) .................. 10-2024-0019219
Apr. 25, 2024    (KR) .................. 10-2024-0055614

(51) Int. Cl.
*G06F 21/57*    (2013.01)
*G16Y 30/10*    (2020.01)

(52) U.S. Cl.
CPC ............ *G06F 21/577* (2013.01); *G16Y 30/10* (2020.01)

(58) Field of Classification Search
CPC .............................. G06F 21/577; G16Y 30/10
See application file for complete search history.

(56) References Cited

U.S. PATENT DOCUMENTS

| 5,287,490 A * | 2/1994 | Sites ........................ G06F 8/52 |
| | | 717/142 |
| 2007/0033442 A1* | 2/2007 | Tillmann ............ G06F 11/3684 |
| | | 714/45 |
| 2018/0121660 A1* | 5/2018 | Choi ..................... G06F 21/577 |
| 2018/0359266 A1* | 12/2018 | Andow .................. G06F 21/62 |
| 2019/0205543 A1* | 7/2019 | Wei ..................... G06F 11/3684 |
| 2020/0380124 A1* | 12/2020 | Yavuz ....................... G06N 7/01 |
| 2022/0108007 A1* | 4/2022 | Zatutschne-Marom ..................... |
| | | G06F 21/52 |

FOREIGN PATENT DOCUMENTS

| KR | 102035246 B1 | 10/2019 |
| KR | 102110735 B1 | 6/2020 |

OTHER PUBLICATIONS

Notice of Allowance for corresponding Korean Application No. 10-2023-0069993, Feb. 21, 2024, 10 pages.

(Continued)

*Primary Examiner* — William S Powers
(74) *Attorney, Agent, or Firm* — Guntin & Gust, PLC; Miyoung Shin

(57) ABSTRACT

Provided are a method and a system for analyzing a vulnerability in software installed on an Internet of things (IoT) device. In the method and the system, a target binary file extracted from firmware of the IoT device is acquired, a taint path is generated by performing taint analysis on the target binary file, transmission information related to the taint path is generated, and a vulnerability is detected in the target binary file by performing symbolic execution on the target binary file on the basis of the taint path and the transmission information.

16 Claims, 16 Drawing Sheets

(56) References Cited

OTHER PUBLICATIONS

Office Action for corresponding Korean Application No. 10-2023-0069993, Jan. 20, 2024, 13 pages.
Mandal, Amit, et al., "Cross-Program Taint Analysis for IoT Systems", The 35th ACM/SIGAPP Symposium on Applied Computing (SAC '20) Mar. 30-Apr. 3, 2020, Brno, Czech Republic, Association for Computing Machinery, 9 pages.

\* cited by examiner

FIG.3A

```
void example_func() {
    $t9 = 0xFF
    test_func($t9)
    source(a#1)
    b#1 = 'echo' + a#1
    c#1 = b#1
    sink(c#1)
    d#1 = 0x00
    test_func2(d#1)
}
```

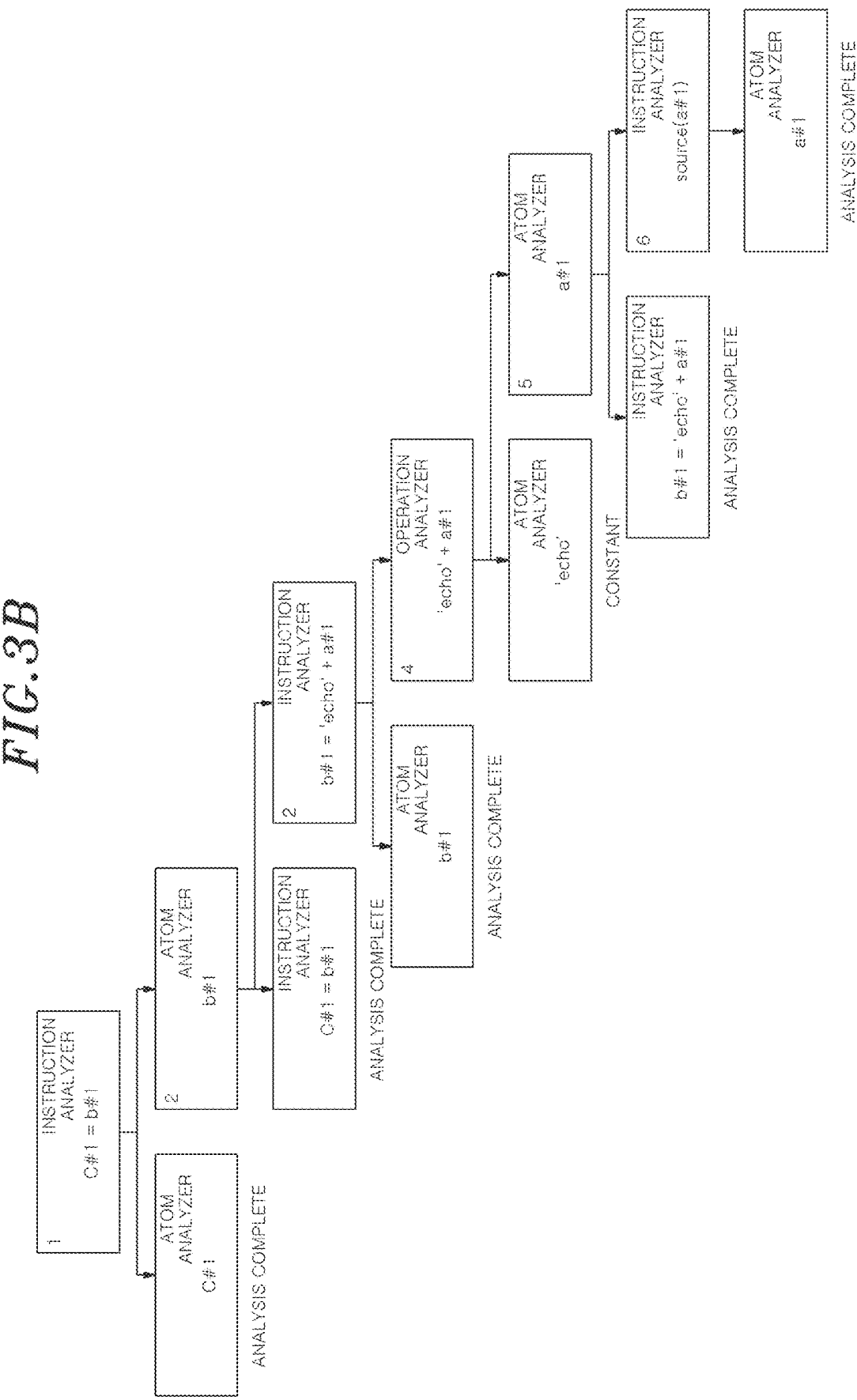

FIG.6

```
 1  {
 2      "abs": {
 3          "return": "int",
 4          "arg": ["int"]
 5      },
 6      "acos": {
 7          "return": "long",
 8          "arg": ["long"]
 9      },
10      "asin": {
11          "return": "long",
12          "arg": ["long"]
13      },
14      "atan": {
15          "return": "long",
16          "arg": ["long"]
17      },
18      "atof": {
19          "return": "long",
20          "arg": ["char"]
21      },
22      "atoi": {
23          "return": "int",
24          "arg": ["char"]
25      },
26      "atol": {
27          "return": "long",
28          "arg": ["char"]
29      },
30      "bsearch": {
31          "return": "pointer",
32          "arg": ["pointer", "pointer", "int", "int", "int"]
33      },
```

FIG. 10

ORIGINAL EXPRESSION CODE OF SAMPLE BINARY FILE

INTERMEDIATE EXPRESSION CODE CONVERTED INTO INTERMEDIATE LANGUAGE (SSA FORM)

FIG.11

```
23 @ 000014dd    rdx_1#1 = var_80#1:0.d
24 @ 000014e6    rcx_131 = 0x64 - rdx_1#1
25 @ 000014e8    rdx_2#2 = rcx_1#1
26 @ 000014ea    rsi_1#1 = rdx_2#2
27 @ 000014ec  3 rcx_2#2 = var_88#1  ──1140c
28 @ 000014f0    rdx_3#3 = var_80#1
29 @ 000014f4  4 rcx_3#3 = rcx_2#2 + rdx_3#3  ──1140d
30 @ 000014f7    rdx_4#4 = [&stdin]                      1130
31 @ 000014fa  5 rdi_1#2 = rcx_3#3  ──1140e
32 @ 000014fd    rax_4#5, mem#3 = fgets(buf: rdi_1#2, n: rsi_1#1, fp: rdx_4#4) @ mem#2
33 @ 00001505    if (rax_4#5 == 0) then 45 @ 0x154f else 51 @ 0x1507

34 @ 00001562    var_80_1#3 = φ (var_80#1, var_80_1#2)
35 @ 00001562    rax_13#17 = φ (rax_3#4, rax_15#7, rax_6#9, rax_10#13, rax_13#16)
36 @ 00001562    rcx_3#4 = φ (rcx#0, rcx_3#3)
37 @ 00001562    rdx_6#8 = φ (rdx#0, rdx_4#4, rdx_7#5, rdx_5#6, rdx_6#7)
38 @ 00001562    rsi_1#2 = φ (rsi#0, rsi_1#1)
39 @ 00001562    rdi_2#4 = φ (rdi#1, rdi_1#2, rdi_2#3)
40 @ 00001562    mem#8 = φ (mem#2, mem#5, mem#6, mem#7)
41 @ 00001562  2 rax_16#18 = var_88#1  ──1140b
                                              ──1110
42 @ 00001566  1 rdi_3#5 = rax_16#18  ──1140a        ──1111
43 @ 00001569    rax_17#19, mem#9 = system(line: rdi#3#5) @ mem#8
44 @ 00001570    if (rax_17#19 == 0) then 55 0x1589 else 59 @ 0x1579
```

SYSTEM AND METHOD FOR ANALYZING VULNERABILITY IN SOFTWARE INSTALLED ON IOT DEVICE

CROSS-REFERENCE TO RELATED APPLICATION

This application claims priority to and the benefit of Korean Patent Application Nos. 10-2023-0069993, filed May 31, 2023, 10-2024-0019219, filed on Feb. 7, 2024, and 10-2024-0055614, filed on Apr. 25, 2024, the disclosures of which are incorporated herein by reference in their entirety.

FIELD OF THE DISCLOSURE

The present disclosure relates to a system and method for detecting a vulnerability in software of Internet of things (IoT) devices.

DISCUSSION OF RELATED ART

Internet of things (IoT) devices are embedded devices capable of network communication. IoT devices are commonly used in various fields around us including finance, personal, industrial, public sectors, and the like, and thus may cause damage, such as privacy breaches, when attacked.

Software (e.g., firmware) provided in IoT devices is distributed in the form of an executable binary, which is the result of compiling. The binary is loaded into a memory in an IoT device, and some instructions of the binary are fetched on a processor from the memory to execute the software.

An analyst performs a vulnerability scan to identify vulnerabilities in the executable binary and prevent problems in the IoT device, but there are limitations in analyzing every part of a program in the firmware.

Lately, there have been attempts to automatically detect vulnerabilities in IoT devices using a dynamic analysis tool based on a fuzzing method. However, dynamic analysis tools depend on runtime environments. Accordingly, due to characteristics of IoT devices installed in various environments, dynamic analysis tools are not ideal for performing dynamically automated analysis.

SUMMARY

The present disclosure is directed to providing a system and method for detecting a vulnerability in software of Internet of things (IoT) devices.

According to an aspect of the present disclosure, there is provided a method for analyzing a vulnerability in software installed on an IoT device, which is performed by a vulnerability analysis device. The method includes: acquiring a target binary file extracted from firmware of an IoT device; generating a taint path and transmission information related to the taint path by performing taint analysis on the target binary file; and detecting a vulnerability in the target binary file by performing symbolic execution on the target binary file on the basis of the taint path and the transmission information. The taint path includes a user function, which is a user input function that is an internal function of the software or a user library function based on an external library of the software.

The generating of the taint path and the transmission information related to the taint path may include: specifying a taint sink in the target binary file; generating a tracking graph by tracking a parameter from the taint sink; determining whether a user function is in the tracking graph and designating the user function as a taint source corresponding to the taint sink; generating a taint path for the target binary file including the taint sink and the taint source; and generating transmission information of the taint path.

The generating of the taint path and the transmission information related to the taint path may include, when it is determined that there is no taint source in the tracking graph, removing the tracking graph.

The specifying of the taint sink in the target binary file may include, when it is determined that a vulnerable function included in a prestored vulnerable function list is used in the target binary file, designating an instruction, in which the checked vulnerable function is used, as a taint sink.

The generating of the tracking graph by tracking the parameter from the taint sink may include: a first operation of processing an instruction corresponding to a position of the taint sink to divide the instruction into a left terms and a right terms; a second operation of processing one of the left and right terms including an operator to divide the left term or right terms into the operator and an argument; a third operation of processing the argument included in the left term or right terms to determine whether the argument is a variable or constant; an operation of searching, when the argument is a variable, the target binary file for at least one instruction in which the argument is used as the variable; and an operation of repeating the first operation to the third operation with each found instruction applied to the instruction analyzer to generate the tracking graph using the instruction having the argument of which analysis has been completed up to an argument level.

The determining of whether a user function is in the tracking graph and the designating of the user function as the taint source corresponding to the taint sink may include: designating the user function as the taint source corresponding to the taint sink on the basis of a call function for calling the taint sink and the tracking graph by comparing all call instructions in a function for calling the taint sink with call instructions in the tracking graph; and specifying the taint source corresponding to the taint sink on the basis of a comparison result of the call instructions.

The determining of whether a user function is in the tracking graph and the designating of the user function as the taint source corresponding to the taint sink may include: when the designated taint source includes at least one function in a preset blacklist after the taint source corresponding to the taint sink is designated, canceling designation of the taint source; determining whether the tracking graph includes a different taint source from the canceled taint source; when it is determined that the tracking graph includes the different taint source, redesignating the different taint source as the taint source corresponding to the taint sink; and regenerating the taint path on the basis of the taint sink and the redesignated taint source.

The transmission information may include one or more of a call function of the taint sink, an address of the call function of the taint sink, a risk stage based on a result of the taint analysis, risk information based on the result of the taint analysis, an address of the taint source, an argument number of a decimal portion, and a size of an argument of the taint sink. The generating of the transmission information related to the taint path may include generating a risk stage for the taint path on the basis of a preset whitelist and generating risk information of the taint path on the basis of the generated risk stage to generate the risk stage and the risk information in the transmission information.

The detecting of the vulnerability in the target binary file by performing the symbolic execution on the target binary file may include: dividing the generated taint path into blocks; performing symbolic execution on the generated taint path on a block-by-block basis on the basis of the transmission information related to the taint path to calculate state information of each block of the taint path; analyzing the block-specific state information to determine a vulnerability of the target binary file; comparing the block-specific state information resulting from the symbolic execution with at least one preset vulnerable pattern to determine whether the block-specific state information corresponds to the compared vulnerable pattern; and when the block-specific state information corresponds to the compared vulnerable pattern, determining that the target binary file of which the state information has been analyzed has a vulnerability.

The performing of the symbolic execution on the generated taint path on a block-by-block basis may include: replacing a value at a start point of a block with a symbol to symbolize the taint path on a block-by-block basis; and performing a symbolic execution operation on the taint path symbolized on a block-by-block basis.

The performing of the symbolic execution operation on the taint path symbolized on a block-by-block basis may include, when a search time for the block to be searched exceeds a preset threshold time or a search frequency of the block exceeds a preset threshold frequency while the block is searched along the taint path, stopping searching the block along the taint path and continuing searching a subsequent block along the taint path to calculate state information of the subsequent block.

The comparing of the block-specific state information resulting from the symbolic execution with the at least one preset vulnerable pattern to determine whether the block-specific state information corresponds to the compared vulnerable pattern may include: registering an argument for a target variable as a symbol to determine whether the target variable to be searched for from a start point of the taint path to an end point reaches a preset vulnerable function; determining whether the symbol or another variable referring to the symbol reaches the vulnerable function; and when it is determined that the block-specific state information resulting from the symbolic execution represents that a user input value reaches a function for executing an instruction, determining that the block-specific state information corresponds to a first vulnerable pattern indicating a first vulnerability.

The comparing of the block-specific state information resulting from the symbolic execution with the at least one preset vulnerable pattern to determine whether the block-specific state information corresponds to the compared vulnerable pattern may further include: determining whether a sign bit of at least one variable in the block is changed during a runtime on the basis of the block-specific state information resulting from the symbolic execution; and when it is determined that a highest sign bit is changed, determining that the block-specific state information corresponds to a second vulnerable pattern indicating a second vulnerability.

The comparing of the block-specific state information resulting from the symbolic execution with the at least one preset vulnerable pattern to determine whether the block-specific state information corresponds to the compared vulnerable pattern may further include: searching a specific path from the start point of the taint path to the end point using a dynamic memory allocation function and a dynamic memory return function; and when state information resulting from the search represents that there are two frees in the specific search path, determining that the block-specific state information corresponds to a third vulnerable pattern indicating a third vulnerability.

According to another aspect of the present disclosure, there is provided a computer-readable recording medium on which a program for performing the method for analyzing a vulnerability in software installed on an IoT device is recorded.

According to another aspect of the present disclosure, there is provided a vulnerability analysis device for detecting a vulnerability in software installed on an IoT device, the vulnerability analysis device including: a communication unit configured to acquire a target binary file extracted from firmware of the IoT device; a taint analysis unit configured to generate a taint path by performing taint analysis on the target binary file and generate transmission information related to the taint path; and a vulnerability analysis unit configured to detect a vulnerability in the target binary file by performing symbolic execution on the target binary file on the basis of the taint path and the transmission information.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 3A is a view of binary code of an exemplary target binary file from which a taint path will be generated;

FIG. 3B is a diagram illustrating a process of generating a tracking graph by analyzing the target binary file of FIG. 3A using an instruction analyzer, an operation analyzer, and an atom analyzer;

FIG. 6 is a view illustrating functions included in a function list according to various embodiments of the present disclosure;

FIG. 10 is a view of a result of converting intermediate representation code into a static single assignment (SSA) form according to various embodiments of the present disclosure;

FIG. 11 is a schematic view illustrating generation of a taint path in the intermediate representation code of FIG. 10;

DETAILED DESCRIPTION OF EXEMPLARY EMBODIMENTS

Figure 1:
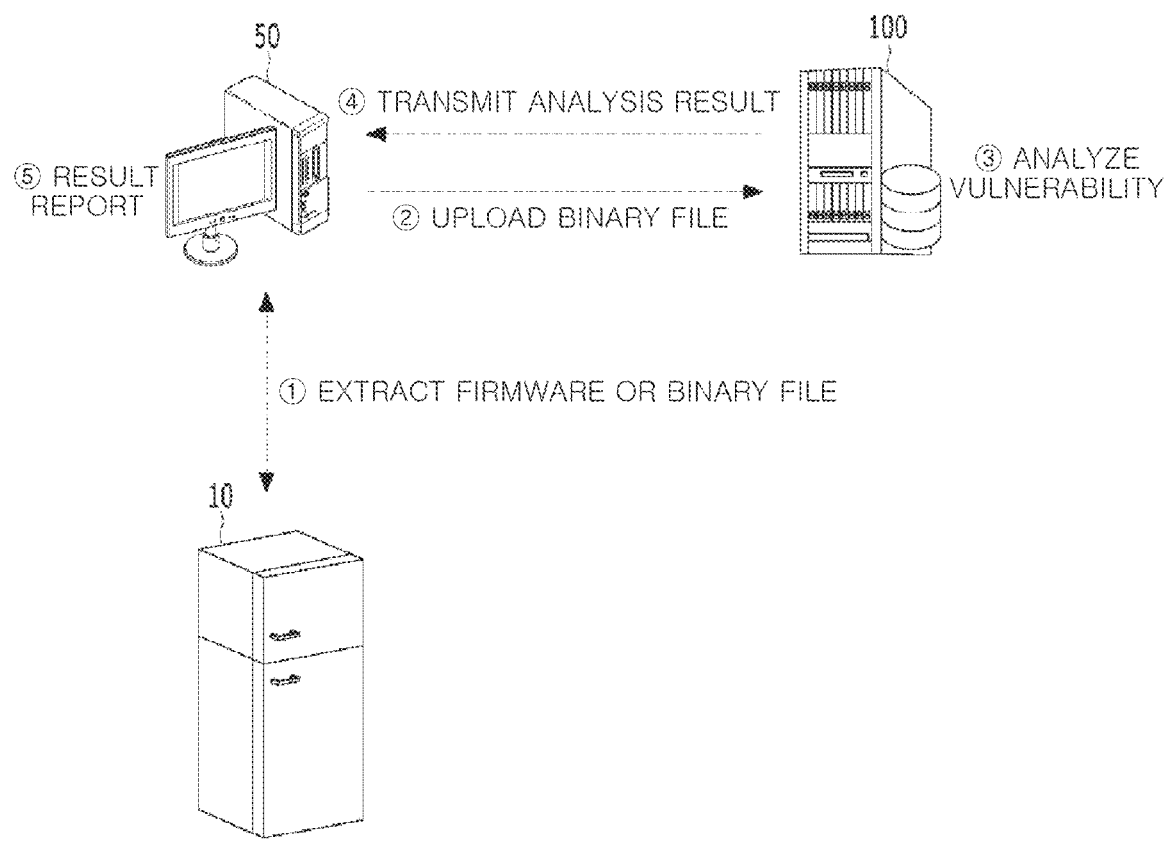
FIG. 1 is a diagram illustrating a network environment of a system according to an aspect of the present disclosure.

Hereinafter, exemplary embodiments of the present disclosure will be described in detail with reference to the accompanying drawings.

However, this is not intended to limit the present disclosure to the specific embodiments, and it is to be understood that the present disclosure includes all modifications, equivalents, and/or alternatives of embodiments of the present disclosure. Throughout the drawings, like reference numerals may refer to like components.

In this specification, the terms "comprise," "comprising," "include," "including," "have," "having," and the like indicate the presence of corresponding features (e.g., integers, functions, operations, steps, parts, elements, constituents, and/or the like) and do not preclude the presence or addition of additional features.

When a first component is referred to as being "connected" or "coupled" to a second component, the first component may be directly connected or coupled to the second component, or an intermediate component may be therebetween. On the other hand, when a first component is referred to as being "directly connected" or "directly coupled" to a second component, there is no intermediate component therebetween.

As used in various embodiments, expressions such as "first," "second," or the like may refer to a variety of components in any order and/or order of importance and do not limit the components. The terms are only used for the purpose of distinguishing one component from others. For example, a first component and a second component may represent different components irrespective of the order or importance of the components.

Singular expressions used in this specification also include plural expressions unless words related to the singular expressions explicitly indicate otherwise.

As used herein, the expression "configured to" may be interchangeably used with, for example, "suitable for," "having the capacity to," "designed to," "adapted to," "made to," or "capable of" according to a situation. The term "configured to" does not always mean "specifically designed to" in hardware. Alternatively, in some situations, the expression "device configured to" may mean that the device is "capable of" something together with other devices or parts. For example, the phrase "processor configured to perform A, B, and C" may be an exclusive processor (e.g., an embedded processor) for performing the corresponding operations or a generic-purpose processor (e.g., a central processing unit (CPU) or an application processor) that performs the corresponding operations by executing one or more software programs stored in a memory device.

A system for detecting a vulnerability in software (e.g., firmware) installed on an Internet of things (IoT) device according to exemplary embodiments of the present disclosure is configured to detect a common weakness enumeration (CWE) of a program extracted from the software through taint analysis and symbolic execution at a binary code level. In the system, any external function implemented in the form of a library by a developer is regarded as a target of analysis, which creates more vulnerability analysis targets in an IoT device.

FIG. 1 is a diagram illustrating a network environment of a system for detecting a vulnerability in software installed on an IoT device according to an aspect of the present disclosure.

Referring to FIG. 1, a system 1 for detecting a vulnerability in a program of an IoT device (hereinafter "vulnerability detection system") includes an IoT device 10, a user terminal 50, and a vulnerability analysis device 100 (hereinafter "analysis device).

The vulnerability detection system 1 according to embodiments may be completely hardware or may have some hardware aspects and some software aspects. For example, "system" or "device" may collectively refer to hardware with a data processing capability and operating software for running the hardware. In this specification, the terms "unit," "system," "device," and the like are intended to refer to a combination of hardware and software which is run by the hardware. For example, hardware may be a data processing device including a CPU, a graphics processing unit (GPU), or another processor. Also, software may be a running process, an object, an executable file, a thread of execution, a program, and the like.

The components 10, 50, and 100 of the system 1 are connected to each other through a wired/wireless communication network. For example, the communication network may be a local area network (LAN), a wide area network (WAN), a virtual network, a mobile network, such as third generation (3G), fourth generation (4G), or fifth generation (5G), remote communication, or the like, but is not limited thereto.

In various embodiments of the present disclosure, a communication network that connects the IoT device 10 and the user terminal 50 may differ from a communication network that connects the user terminal 50 and the analysis device 100. For example, the communication network that connects the IoT device 10 and the user terminal 50 may have a shorter communication range than the communication network that connects the user terminal 50 and the analysis device 100.

The IoT device 10 is an embedded device which may perform network communication. The IoT device 10 may be, for example, an access point (AP), a closed-circuit television (CCTV), a network-attached storage (NAS) device, a refrigerator, an air conditioner, or another IoT appliance on which firmware is installed, but is not limited thereto.

The user terminal 50 is a component that functions as a client device for the analysis device 100 in wired/wireless communication with the analysis device 100.

The user terminal 50 may be a computing system that includes hardware, software, or embedded logic components or a combination of two or more components thereof and may perform appropriate functions implemented or supported by the user terminal 50. The user terminal 50 may be, for example, a desktop computer, a laptop computer, a netbook, a tablet computer, an e-book reader, a Global Positioning System (GPS) device, a camera, a personal digital assistant (PDA), a portable electronic device, a cellular phone, a smartphone, another computing device, another mobile device, another wearable device, another appropriate electronic device including a processor, a memory, and a transceiver unit, or a computing system which is any appropriate combination thereof. However, these are merely examples, and the user terminal 50 may also be implemented in the form of a server that provides a different service from a service provided by the analysis device 100 (i.e., a vulnerability detection service) below.

In wired/wireless communication with the IoT device 10, the user terminal 50 extracts a binary file of firmware installed on the IoT device 10 and provides the extracted binary file to the analysis device 100 as a target binary file that is to be analyzed for whether there is a vulnerability.

Also, the user terminal 50 may receive the analysis result of the analysis device 100 and output the analysis result.

According to various embodiments of the present disclosure, the system 1 may be configured to implement an input screen for providing the binary file to the analysis device 100 or an output screen for outputting the vulnerability analysis result to a user in the form of a webpage. The user terminal 50 may transmit and receive information to and from a server through the webpage.

Operations of the user terminal 50 will be described in detail below with reference to FIG. 8 and the like.

The analysis device 100 is a device that performs an operation of detecting a vulnerability in the target binary file.

According to various embodiments of the present disclosure, the analysis device 100 may be implemented as a device that is connected to the user terminal 50 and functions as a server. The analysis device 100 may be a unitary server or implemented as a distributed server spanning multiple computers or multiple datacenters. In various embodiments of the present disclosure, the analysis device 100 is multiple computer systems implemented as a network server or computer software. Here, the network server is a computer system and computer software (a network server program) that are connected to a sub-device, which may communicate with another network server, through a computer network, such as a private intranet or the Internet, to receive a task request, perform the task, and provide the result. In addition to such a network server program, the network server is to be understood as a broader concept that includes a set of application programs running on the network server and, in some cases, various databases (DBs) built therein. The server 100 may be implemented as any type of computing device, such as a network server, a web server, a file server, a supercomputer, a desktop computer, or the like, or a combination thereof. To this end, the analysis device 100 includes at least one processor for processing data, a memory for storing data, and a communication unit for transmitting and receiving data.

When the target binary file to be analyzed is received from the user terminal 50, the analysis device 100 may detect a vulnerable function in the target binary file through taint analysis, generate a taint path to a user function by tracking a parameter of the detected vulnerable function, and analyze the taint path through symbolic execution to detect a vulnerability in the target binary file.

The analysis device 100 may report a vulnerability analysis result to the user through the user terminal 50.

The taint path includes the user function, and the user function is a user input function which is an internal function of the software or a user library function based on an external library of the software.

The user function may be a user input function or a user library function. The user input function may be an internal function of firmware that is preset to request a user input. The user input function may be an internal function that is known to request a user input, for example, "scanf," "fgets," or the like. The user library function is an external function of the firmware that is implemented in the form of a library by the user or developer with reference to an external library.

The configuration and operations of the analysis device 100 will be described in further detail below with reference to FIGS. 2 to 15.

Figure 2:
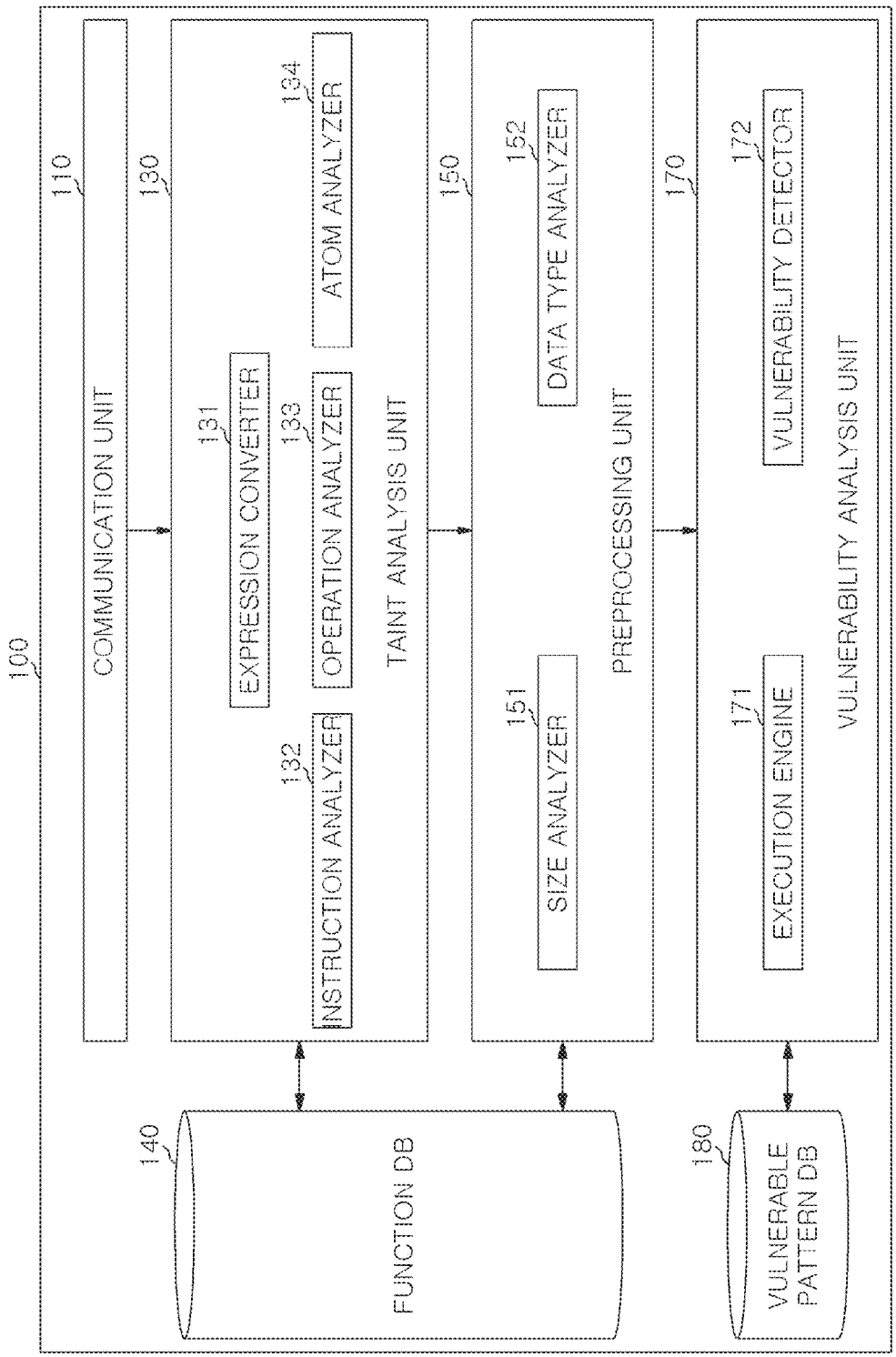
FIG. 2 is a block diagram of an analysis device according to various embodiments of the present disclosure.

FIG. 2 is a block diagram of an analysis device according to various embodiments of the present disclosure.

Referring to FIG. 2, the analysis device 100 includes a communication unit 110, a taint analysis unit 130, a function DB 140, a vulnerability analysis unit 170, and a vulnerable pattern DB 180. According to various embodiments of the present disclosure, the analysis device 100 may further include a preprocessing unit 150.

The function DB 140 stores function-related information. For example, the function DB 140 may store a list of user functions and information related to the user functions in the list.

According to various embodiments of the present disclosure, the function DB 140 may include a vulnerable function list and a call function list. Each list includes information related to corresponding functions.

In some embodiments, the function DB 140 may further include a blacklist, a whitelist, and a function data list.

The lists stored in the function DB 140 will be described in further detail below.

The vulnerable pattern DB 180 includes vulnerable patterns for determining whether state information resulting from symbolic execution of the target binary file corresponds to the vulnerable patterns. The vulnerable patterns will be described in further detail below.

The DBs 140 and 180 are integrated with the analysis device 100 or implemented as a DB server outside of the analysis device 100 and connected to the analysis device 100. In some embodiments, information stored in DBs may be structured according to a specific data structure. Each DB 140 or 180 may be a relational, column, correlation, or other appropriate DB. Although a specific type of DB is described or illustrated in this specification, any appropriate type of DB is taken into consideration. In some embodiments, the system 1 may provide an interface that allows management, search, change, addition, or deletion of information stored in the DB 140 or 180 through the analysis device 100 or the user terminal 50.

For clarity of description, operations of the analysis device 100 are described with an embodiment in which the DBs 140 and 180 are integrated with the analysis device 100, but it is apparent to those of ordinary skill in the art that this is illustrative.

The communication unit 110 may be a software or hardware module that performs a communication interface operation such as inputting data from an external device (e.g., the user terminal 50) to the analysis device 100 or outputting data from the analysis device 100.

The analysis device 100 may acquire the target binary file extracted from the firmware of the IoT device 10 through the communication unit 110.

The taint analysis unit 130 is a component that analyzes a taint path from the target binary file by performing a taint analysis operation on the target binary file received by the communication unit 110.

Taint analysis is an analysis method of determining whether elements are affected by another element and identifying the cause and influence of a problem using the case where elements are tainted by a suspicious element.

In various embodiments of the present disclosure, the taint analysis unit 130 may be configured to perform a static taint analysis operation. Static taint analysis is a data flow analysis technique for checking how a user input value flows in a program, which is used to statically detect a security vulnerability.

The taint analysis unit 130 of FIG. 2 may be configured to designate a taint sink in the target binary file as a tracking starting point, generate a tracking graph by tracking a parameter from the taint sink, designate a taint source in the target binary file on the basis of the tracking graph and a call function which is preset to call the taint sink, and generate a path from the taint sink to the taint source in the tracking graph as a taint path. The taint analysis unit 130 may be further configured to generate information related to the taint path when the taint path is generated.

In various embodiments of the present disclosure, the taint analysis unit 130 may be configured to determine whether the target binary file includes at least one of vulnerable functions included in the prestored vulnerable function list to determine the position of the taint sink in the target binary file, and when a vulnerable function is included in the target binary file, designate the position of the included vulnerable function as the position of the taint sink.

The vulnerable function list is prestored in the function DB 140. The vulnerable function list is a list of functions in which vulnerabilities may occur. The vulnerable function list may include one or more of, for example, system, execl, execlp, execv, execle, execve, popen, and do_system. However, the vulnerable functions in the vulnerable function list are illustrative and are not limited thereto.

The taint analysis unit 130 may determine whether each function used in the target binary file corresponds to a vulnerable function included in the vulnerable function list.

To generate the tracking graph, the taint analysis unit 130 may include an instruction analyzer 132, an operation analyzer 133, and an atom analyzer 134. The taint analysis unit 130 may analyze the target binary file from the taint sink, which is the tracking starting point, on block-by-block, operation-by-operation, and atom-by-atom bases to track parameters logically connected to the taint sink and generate the tracking graph.

The instruction analyzer 132 process the target binary file on an instruction-by-instruction basis to divide the processed instructions into a left term and a right term, transmits one of the divided left and right terms including an operator to the operation analyzer 133, and transmits the other of the divided left and right terms including no operator to the atom analyzer 134.

For example, the instruction analyzer 132 may process code components, such as a=b, a=b+c, and a=call(b), on an instruction-by-instruction basis. In some embodiments, the instruction analyzer 132 may store an analysis log. The instruction analyzer 132 may determine whether an input instruction is an instruction included in the analysis log, and when the input instruction is an instruction included in the analysis log, may consider that an instruction that has already been analyzed has been input again and not perform an analysis operation.

The operation analyzer 133 processes the left term or right term on an operation-by-operation basis to determine whether a left-or right-term component is an operator and transmits the term component which is not the operator to the atom analyzer 134. Since the term component which is not the operator is an argument, the operation analyzer 133 may classify a term component as an argument or an operator. For example, the operation analyzer 133 may process code components, such as a+b, a−b, and a % b on an operation-by-operation basis. Then, operators such as +, −, and % are distinguished from term components other than operators such as a and b, that is, arguments, and a and b are transmitted to the atom analyzer 134.

The atom analyzer 134 processes an argument to be analyzed in the instruction on an atom-by-atom basis to classify the argument as a variable or constant. An atom unit may be one number, value, or symbol, or a combination of two or more thereof. For example, the atom analyzer 134 may process code components, such as a, &a, *a, and 1, on an atom-by-atom basis. In some embodiments, the atom analyzer 134 may store an analysis log. When a variable of a target of analysis is an already-analyzed variable, the atom analyzer 134 may not perform analysis. Specifically, when a specific argument is input as an argument to be analyzed, the atom analyzer 134 determines whether the argument is included in the analysis log. When the input argument is included in the analysis log, the atom analyzer 134 may consider that an instruction that has already been analyzed has been input again and not analyze the argument, and may not extend the tracking graph any more.

Also, when an argument to be analyzed is analyzed as a variable in the atom analyzer 134, the atom analyzer 134 searches the target binary file for at least one instruction in which the argument analyzed as a variable is used and inputs each found instruction to the instruction analyzer 132. Then, the taint analysis unit 130 may track each logical relationship with each input instruction in the code and continuously analyze taint propagation of the input instruction.

The taint analysis unit 130 may generate the tracking graph for generating a taint path on the basis of analysis results of the internal analyzers 132 to 134. The tracking graph is a graph showing taint propagation from a vulnerable function.

FIG. 3A is a view of binary code of an exemplary target binary file from which a taint path will be generated, and FIG. 3B is a diagram illustrating a process of generating a tracking graph by analyzing the target binary file of FIG. 3A using an instruction analyzer, an operation analyzer, and an atom analyzer.

In the target binary file of FIG. 3A, it is assumed that a taint sink and a taint source are indicated by sink(c #1) and source(a #1), respectively.

The taint analysis unit 130 may specify the taint sink sinc(c #1) using a preset vulnerable function list.

Subsequently, the taint analysis unit 130 may generate a tracking graph which has the designated taint sink as a start point and specify a taint source. Specifically, as shown in FIG. 3B, the taint analysis unit 130 starts tracking taint propagation from the instruction c #1=b #1 related to c #1, which is the argument of the taint sink, through the internal analyzers 132, 133, and 134. The instruction c #1=b #1 is an instruction for defining c #1 which is the argument value of the taint sink in FIG. 3A.

The instruction analyzer 132 divides the instruction c #1=b #1 in which the argument value of the taint sink, which is the start point of the taint path, is used into a left term and a right term and transmits both the left and right terms to the atom analyzer 134 because there is no operator in either of the left and right terms. The atom analyzer 134 determines whether the received analysis values of the instruction analyzer 132, that is, the argument(s) of the left and right terms, are variables or constants. In FIG. 3B, the argument c #1 of the left term has already been analyzed to determine a taint sink and thus may not be analyzed again. The atom analyzer 134 classifies the argument b #1 of the right term as a variable. Also, since the argument b #1 of the right term is a variable, the atom analyzer 134 searches the target binary file for the instructions c #1=b #1 and b #1='echo'+a

1 in which the variable b #1 is used, and transmits the instructions to the instruction analyzer 132.

The instruction analyzer 132 may only analyze b #1='echo'+a #1 which is an instruction received from the atom analyzer 134 and not c #1=b #1 which has already been analyzed on an instruction-by-instruction basis, to divide the input instruction b #1='echo'+a #1 into left-and right-term components. The instruction analyzer 132 transmits the left-term component b #1 to the atom analyzer 134 because the left-term component b #1 only includes an argument, and transmits the right-term component 'echo'+a #1 to the operation analyzer 133 because the right-term component 'echo'+a #1 includes an operator. The operation analyzer 133 classifies components of the received right term 'echo'+a #1 into an operator and components which are not operators, and transmits the components which are not operators, that is, arguments, 'echo' and a #1 to the atom analyzer 134. The atom analyzer 134 does not analyze b #1 which has already been analyzed again. Also, the atom analyzer 134 analyzes 'echo' and a #1 and classifies 'echo' as a constant and a #1 as a variable. The atom analyzer 134 searches for the instructions source(a #1), b #1='echo'+a #1 in which the variable a #1 is used and transmits the instructions to the instruction analyzer 132. Then, the instruction analyzer 132 analyzes source(a #1) among the received instructions and transmits the analysis result to the atom analyzer 134, and the atom analyzer 134 may analyze the analysis result of the instruction analyzer 132 by processing the analysis result on an atom-by-atom basis.

The taint analysis unit 130 may extend the tracking graph by tracking a parameter which has not been analyzed. Extension of the tracking graph may be finished when analysis is finished up to an atom level.

In various embodiments of the present disclosure, to determine a taint source on the basis of a function for calling the taint sink and the tracking graph, the taint analysis unit 130 may compare all call instructions which are preset to call the taint sink in the call function with a call instruction in the tracking graph and determine a taint source corresponding to the taint sink on the basis of comparison results between the call instructions.

The end point of the tracking graph may not correspond to the position of the taint source. The taint source may be an intermediate point of the tracking graph.

When the comparison result is that the call instruction in the tracking graph matches at least one of the call instructions in the call function for calling the taint sink, the taint analysis unit 130 determines that a taint source is present in the tracking graph. The taint analysis unit 130 may designate the matching call instruction as a taint source corresponding to the taint sink. The taint source is the end point of the taint path. When the taint source is determined, the position of the taint source in the target binary file is also automatically determined.

The taint analysis unit 130 lists all call instructions [test_func($t9), source(a #1), sink(c #1), test_func2(d #1)] in example_func( ), which is a function for calling sink(c #1), in the binary code of FIG. 3A and compares the call instructions with call instructions in the tracking graph. Since the tracking graph only has the call instruction source (a #1), the instruction source (a #1) is designated as a taint source.

As described above, the taint analysis unit 130 designates a taint sink rather than a taint source as a tracking starting point. Accordingly, even when there is no information related to a taint source at the time of starting a taint analysis operation, it is possible to start the taint analysis operation.

Also, the taint analysis unit 130 can rapidly generate a taint path compared to other taint analysis methods in which a taint source is designated as a tracking starting point to track the propagation of tainted data from the taint source to a potentially vulnerable point.

In addition, the taint analysis unit 130 may perform a verification operation on the taint source designated as the end point of the taint path. Specifically, the taint analysis unit 130 may be further configured to redesignate the taint source on the basis of a preset blacklist.

As taint sources, the taint analysis unit 130 may designate functions included in the blacklist among all call functions in the tracking graph and the call functions other than a function designated as the taint sink. In other words, some call functions which are designated in advance as taint sinks may be excluded in the redesignation process.

In various embodiments of the present disclosure, to redesignate the taint source on the basis of the preset blacklist, the taint analysis unit 130 may be configured to cancel the designation of the taint source when the designated taint source includes at least one function in the preset blacklist after the taint source corresponding to the taint sink is designated, determine whether the tracking graph includes a different taint source from the canceled taint source, and redesignate the different taint source as the taint source corresponding to the taint sink when it is determined that the tracking graph includes the different taint source.

The blacklist is a list of functions that are not allowed to be designated as taint sources. The blacklist may include call functions that are not designated as taint sources. The blacklist is stored in the function DB 140 in advance. The blacklist may include one or more functions of, for example, "abs," "across," "asin," "printLine," "atan," "atof," "atoi," "atol," "bsearch," "calloc," "ceil," "clearerr," "cos," "cosh," "creatnew," "creattemp," "_C_Quickpool_Int," and "_close." However, functions in the blacklist are not limited thereto.

In the exemplary binary code of FIG. 3A, source (a #1) is designated as a taint source because source (a #1) happens to be the only call instruction. However, in an actual taint analysis process, all call instructions in the tracking graph may be designated as taint sources, which lead to overdetection. The taint analysis unit 130 can prevent overdetection by not designating all call instructions in a tracking graph as taint sources using the preset blacklist.

The taint analysis unit 130 may generate the taint path that has the taint sink as the start point and has the taint source as the end point. The taint analysis unit 130 may apply a designated taint sink and taint source to a preset path detection algorithm, generating a taint path that has the position of the taint sink as a start point and the position of the taint source as an end point. In some embodiments, the taint analysis unit 130 may generate a taint path using a breadth-first search algorithm.

Then, the taint analysis unit 130 may generate the taint path including instructions of a detected portion of the tracking graph from the taint sink to the taint source.

Figure 4:
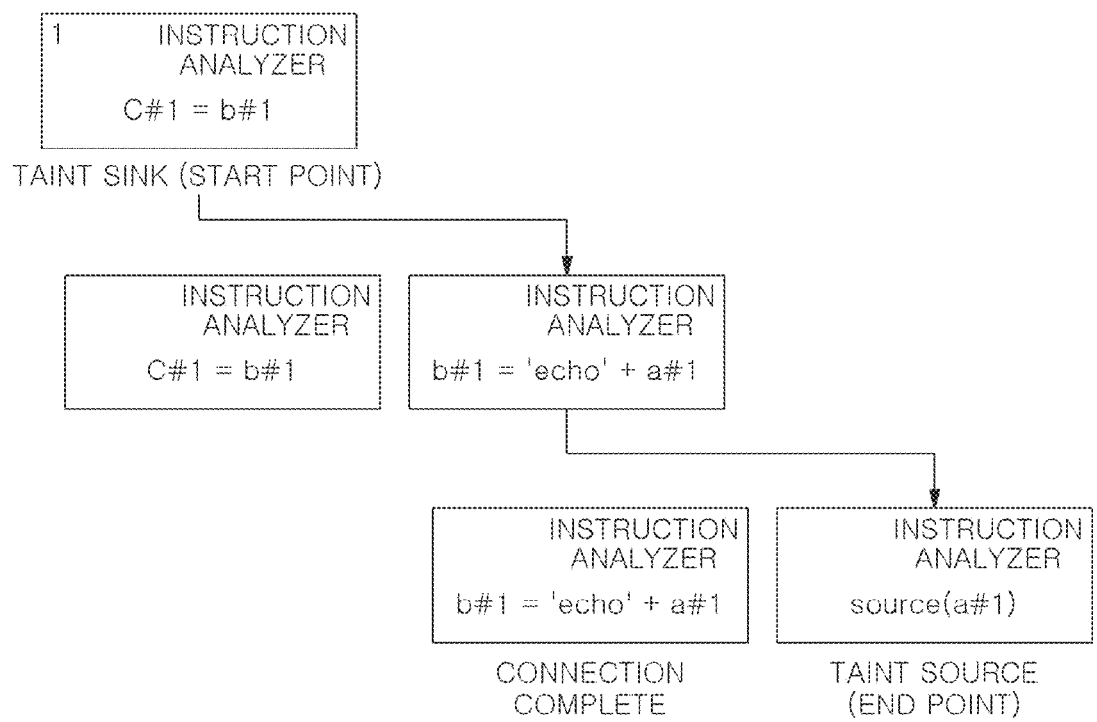
FIG. 4 is a diagram illustrating a taint path that is searched using a taint sink and a taint source of FIG. 3B.

FIG. 4 is a diagram illustrating a taint path that is searched using a taint sink and a taint source of FIG. 3B.

Referring to FIG. 4, the taint analysis unit 130 may generate a taint path ["c #1=b #1," "b #1='echo'+a #1," "source(a #1)"] including a designated taint source and taint sink and instructions therebetween from the tracking graph.

Also, the taint analysis unit 130 may generate information for symbolic execution on the basis of the taint path. The information for symbolic execution is information transmitted to the vulnerability analysis unit 170 and may be referred to as transmission information in this specification. The transmission information is information related to components (e.g., variables) in a taint path. The transmission information includes information required for the vulnerability analysis unit 170 to perform a symbolic execution operation. The transmission information includes identification information of the taint path and related information of the taint path.

In various embodiments of the present disclosure, the transmission information may include at least one of a call function of the taint sink, an address of the call function of the taint sink, a risk stage based on a taint analysis result, risk information based on the taint analysis result, an address of the taint source, an argument number of a decimal portion, an address of the taint sink, an argument number of the taint sink, and a size of the argument of the taint sink.

The taint analysis unit 130 may generate the risk stage and risk information of the taint path as taint analysis results. The risk stage and risk information may be included in the transmission information of the taint path.

The risk stage is information representing the degree of detected risk in the taint analysis results. The risk stage may be represented by one of a plurality of risk levels. For example, the risk stage may be represented by a "high," "medium," or "low" level but is not limited thereto.

The risk information represents a risk detected in the taint path. In some embodiments, when the risk stage is a preset threshold degree of risk or more, it is considered that a risk is detected in the taint path. In the above example, the threshold degree of risk may be set to "medium." Then, when the degree of risk "high" or "medium" is detected, risk information may be generated.

The risk information is information describing a risk stage and may be represented by an instruction in which a risk is detected and the analyzed risk stage. The risk information may be expressed as, for example, "global variable in sink: High," "input Symbol & buffer argument: High," or "Input Symbol: Medium."

In some embodiments, the taint analysis unit 130 may generate a risk stage for the taint path on the basis of a preset whitelist and generate risk information of the taint path on the basis of the generated risk stage. Specifically, the taint analysis unit 130 may determine whether there is a function matching a function designated as a taint source in the taint path among functions in the preset whitelist and determine a risk stage, which is associated in advance with the function matching the function designated as a taint source in the whitelist, as a risk stage of a taint source included in the whitelist.

The whitelist is a list of user functions that may be designated as taint sources. User functions with relatively high risk stages are included in the whitelist. In some embodiments, the functions in the whitelist may be user functions with the preset threshold degree of risk or higher (e.g., "medium").

In various embodiments of the present disclosure, the whitelist may include one or more user input functions in the system 1. The whitelist may include one or more user input functions among, for example, "recv," "fgetc," "fets," "fgetwc," "fscanf," "fwscanf," "fread," "read," "getc," "gets," "getch," "getche," "getchar," "getenv," "getwc," "getwchar," "scanf," "sscanf," "swscanf," and "vscanf." However, the user input functions in the whitelist are not limited thereto.

Also, the whitelist may include risk stages that are associated in advance with the user input functions. Each user input function is associated with a risk stage preset by the user.

In the system 1 where a user library function which is any external function and a user input function which is an internal function may both be designated as taint sources, the taint analysis unit 130 may generate a risk stage and risk information of a user input function designated as a taint source using the whitelist, making it possible to determine which one is more dangerous between the user input function designated as a taint source and the user library function designated as another taint source.

Also, in some embodiments, the taint analysis unit 130 may further include an expression converter 131. Before the taint analysis operation is performed, the expression converter 131 converts a data expression in the original target binary file extracted from the IoT device 10 into an expression format which is preset for taint analysis. The preset expression format may be referred to as an intermediate expression format. The code converted into the intermediate expression format may be referred to as intermediate expression code.

The expression converter 131 may convert original code based on various expression methods into preset intermediate expression code.

The expression converter 131 may generate decompiled code by decompiling the binary code of the target binary file and convert the expression of the decompiled code into intermediate expression code while preserving the substantial content of the decompiled code. The converted intermediate expression code is handled as decompiled code in subsequent operations.

In some embodiments, when the taint analysis unit 130 is based on the binary ninja intermediate language (BNIL), the taint analysis unit 130 may convert the binary code of the target binary file having the original format into intermediate expression code which satisfies a data format based on the static single assignment (SSA) form.

The binary code of the target binary file may be converted from the original data format into intermediate expression code which satisfies the data format of the SSA form. When the SSA form is used, a new variable is assigned with branching in the code, and thus it is easy to generate a taint path of a variable in taint analysis.

The taint analysis unit 130 may provide the generated taint path and transmission information corresponding to the taint path to the preprocessing unit 150 or the vulnerability analysis unit 170. This operation of the taint analysis unit 130 will be described in further detail below with reference to FIG. 8 and the like.

The preprocessing unit 150 analyzes information related to at least one argument in the taint path and updates the transmission information so that the vulnerability analysis unit 170 can easily analyze the taint path generated by the taint analysis unit 130 and the transmission information. With the preprocessing operation of the preprocessing unit 150, argument-related information in the transmission information corresponding to the taint path is processed, or information related to a new argument is added.

The preprocessing unit 150 includes a size analyzer 151 that calculates the size of a variable in the taint path. In some embodiments, the preprocessing unit 150 may further include a data type analyzer 152 that determines the data type of a variable in a taint path.

The size analyzer 151 may measure the size of at least one of variables in the taint path. The preprocessing unit 150 may add the measured size of the at least one variable in the taint path to the transmission information of the taint path. Also, the preprocessing unit 150 may process the expression data of the variable on the basis of the measured size of the variable.

In various embodiments of the present disclosure, when the taint path includes a stack variable, the size analyzer 151 may calculate the size of the stack variable and add the size information of the stack variable to the transmission information of the taint path. The transmission information to which the size information of the stack variable is added may be provided to the vulnerability analysis unit 170 and used for performing a symbolic execution operation.

Figure 5:
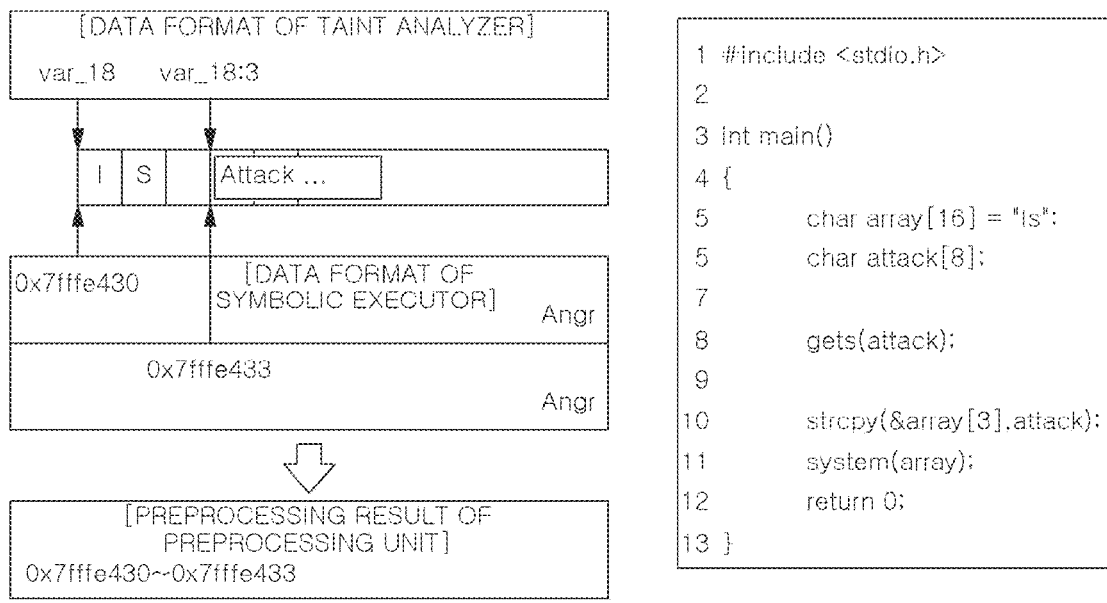
FIG. 5 is a diagram illustrating an operation of measuring the size of a stack variable according to various embodiments of the present disclosure.

FIG. 5 is a diagram illustrating an operation of measuring the size of a stack variable according to various embodiments of the present disclosure.

In the case of analyzing a string, only an address is checked in symbolic execution unlike taint analysis in which the string is analyzed as an array. Accordingly, the size information of a variable is not provided to the vulnerability analysis unit 170 which performs a symbolic execution operation, and when the vulnerability analysis unit 170 performs a symbolic execution operation without considering the size information of a variable, it is difficult to determine whether a string is the same as the string which is a target of taint analysis.

Also, the preprocessing unit 150 may process the expression data of the stack variable to be suitable for a preset data format of the vulnerability analysis unit 170.

Referring to FIG. 5, the preprocessing unit 150 may calculate the offset between a stack variable in the taint path and another variable at a position next to the position of the stack variable in the target binary file. To assign a stack variable in a function, variables having different offsets are stacked on the basis of a stack base so that a data space is provided. The preprocessing unit 150 may distinguish the stack variable by calculating the offset between the stack variable and another variable on the basis of the stack base and calculate the size of the stack variable distinguished with the offset.

Here, the calculated offset value includes a padding value. The data space of the stack variable is generated in units of a size determined according to an architecture or operating system (OS), and in this process, the padding value is used. Due to the padding value, the data space given to the stack variable may be larger than an array value of the stack variable actually generated from the code, but the encroachment of this area does not cause any problem with the program. Accordingly, even when a value larger than the array value of the stack variable actually generated from the code is input as an input of the stack variable, if the data space is occupied up to the padding value, the input value of the stack variable does not encroach on the value of another variable. As a result, it is safe to calculate the size of the stack variable including the padding value. In other words, the padding value may serve as a buffer.

When the taint path includes a stack variable, the size analyzer 151 may calculate the size of the stack variable and add the size information of the stack variable to the transmission information of the taint path. To process the expression data of the stack variable to be suitable for the preset data format of the vulnerability analysis unit 170, the size analyzer may calculate the offset between the stack variable in the taint path and another variable at a position next to the position of the stack variable in the target binary file on the basis of the stack base and calculate the size of the stack variable distinguished with the offset. As shown in FIG. 5, when processing an array, the BNIL-based taint analysis unit 130 specifies a name which is the base of a variable array and then expresses the offset of the variable array using a string such as ":3." On the other hand, the angr-based vulnerability analysis unit 170 expresses a variable on the basis of the memory address of the variable. Even in the case of the same variable, array is expressed as 0x7fffe430, and array[3] is expressed as 0x7fffe433. As a result, when the variable arrays of the BNIL-based taint analysis unit 130 are directly input to the angr-based vulnerability analysis unit 170, the angr-based vulnerability analysis unit 170 is not aware that the two variable arrays are variables having the same array and simply determines that the two variable arrays are variables having different addresses. To solve this problem, the preprocessing unit 150 calculates the size of a stack variable and processes the expression of the stack variable using the calculated stack size. For example, in the example of FIG. 5, the expression of the stack variable array is processed as "address of array[0]+16(0x7fffe43f)." When the processing result is supplied to the vulnerability analysis unit 170, the vulnerability analysis unit 170 may determine that values of the range from 0x7fffe430 to 0x7fffe43f are one array. Subsequently, the vulnerability analysis unit 170 may be aware that the memory address of a value input through "gets" is a value included in the array.

In consideration of such a difference in language/data format, the size analyzer 151 preprocesses an analysis result of the taint analysis unit 130 according to the preset data format of the vulnerability analysis unit 170. Specifically, the size analyzer 151 may calculate the offset of the stack variable as the size of the stack variable and process the expression data (e.g., transmission information) of the stack variable using the calculated size of the stack variable.

Also, the data type analyzer 152 may be further configured to determine the data type of at least one of the variables in the taint path. The data type analyzer 152 may process the data type information of a variable of a target of data type analysis in the transmission information of the taint path into a determined data type.

In various embodiments of the present disclosure, the data type analyzer 152 may be configured to analyze the data type of the stack variable in at least one of the argument aspect, the return value aspect, and the format string aspect of a function and determine the data type of the stack variable.

In some embodiments, the data type analyzer 152 may be further configured to analyze the data type of the stack variable in the argument aspect of a function and determine the data type of the stack variable. Specifically, the data type analyzer 152 may determine whether the stack variable is an argument which is input to a function in a prestored function data list to analyze the data type of the stack variable in the argument aspect of a function, and when the stack variable is determined to be an argument which is input to a function in the prestored function data list, determine the data type of the argument related to the function in the function data list as the data type of the stack variable.

Also, the data type analyzer 152 may be further configured to analyze the data type of the stack variable in the return value aspect of a function and determine the data type of the stack variable. Specifically, the data type analyzer 152 may determine whether a return value of a function to which the stack variable is input is a return value which is input to a function in the prestored function data list to analyze the data type of the stack variable in the return value aspect of a function, and when the stack variable is determined to be a return value which is input to a function in the prestored function data list, determine the data type of the return value related to the function in the function data list as the data type of the stack variable.

The function data list is a list of information related to functions. The function data list is a record of the names of functions, the data types of arguments, and the data types of return values of the functions. The function data list is stored in the function DB 140 in advance.

FIG. 6 is a view illustrating functions included in a function list according to various embodiments of the present disclosure.

As shown in FIG. 6, the function data list includes functions that are known to the system 1 in advance.

The preprocessing unit 150 may search the prestored function data list for a function to which a stack variable is input. The known function data list includes return data types and argument data types other than variable arguments as items.

When the stack variable is an argument that is set to be input to a known function, the preprocessing unit 150 checks an instruction at a position where each stack variable is used in a function. When the left term of the corresponding instruction is a register which is used as an argument, the preprocessing unit 150 may search for a call instruction to check the name of a function to which the stack variable is input, and search the function data list for the function name to check the data type of the argument.

When the stack variable is a return value that is set to be input to a known function, the preprocessing unit 150 checks an instruction at a position where each stack variable is used in a function like in the case of an argument. When the right term of the corresponding instruction is a register which is used as an argument, the preprocessing unit 150 may search for a call instruction to check the name of a function to which the stack variable is input, and search the function data list for the function name to check the data type of the return value.

The preprocessing unit 150 may generate final transmission information by transforming at least some of the transmission information including a measured size of the stack variable and the determined data type of the stack variable into a data format which is preset for the vulnerability analysis unit 170. The data format which is preset for the vulnerability analysis unit 170 may be, for example, the JavaScript Object Notation (JSON) format, but is not limited thereto.

In some embodiments, when the taint analysis unit 130 performs taint analysis on the basis of the BNIL, the preprocessing unit 150 may convert the decompiled binary code into a low level on the BNIL before determining the data type of a variable. The preprocessing unit 150 may determine the data types of variables in the binary code that is represented in the low-level intermediate language (IL).

The system of the BNIL includes a low-level IL, a medium-level IL, and a high-level IL. At a higher level in the BNIL, additional analysis and code optimization occurs, which is more user-friendly.

The preprocessing unit 150 may check arguments used in functions on the basis of decompiled code. When a variable in the decompiled code is not input as an argument but a result value of a function is directly input, a register may be seen as an argument or checked as the function in some cases. The preprocessing unit 150 may convert the decompiled code into a low-level IL, which accurately represents the data types of arguments, and determine the data types of variables.

Figure 7:
FIG. 7 is a view of a result obtained by converting high-level code into low-level code according to various embodiments of the present disclosure.

FIG. 7 is a view of a result obtained by converting high-level code into low-level code according to various embodiments of the present disclosure.

Referring to FIG. 7, the preprocessing unit 150 may check variables used as arguments in a "sprintf" function expressed at a high level. The variable "var_38" is used as "% S" and thus is a string variable. The value of the variable "rax_1" is checked not to be a stack variable. When the "sprintf" function is converted into a low level, the result value of a function "strlen" is used as "% d." When arguments in the "sprintf" function are checked, it may be seen that "var_c_1" becomes "% d." As a result, the preprocessing unit 150 may determine the data type of the variable "var_c_1" to be an int type variable.

Also, when the data type of a stack variable is not determined in the argument aspect or the return value aspect, the data type analyzer 152 may be further configured to analyze the stack variable in the format string aspect and determine the data type of the stack variable. Specifically, to determine the data type of the stack variable in the format string aspect, the data type analyzer 152 may search for strings having a format string among strings used in the target binary file to determine whether a string including a format string is used in the range of a function to which the stack variable is input, and when it is determined that a string including a format string is used in the range of the function to which the stack variable is input, match the format string used in the string to the stack variable to determine the data type of the stack variable.

The preprocessing unit 150 may convert the transmission information of the taint path into a data format corresponding to the vulnerability analysis unit 170 by processing the transmission information using the determined sizes and data types of variables. For example, in the data type information of a stack variable included in the transmission information of the taint path, the data type information of the stack variable is represented in the BNIL, but when the data type information of the stack variable is processed into a data type determined by the preprocessing unit 150, the existing transmission information of the taint path is updated as transmission information in which the data type information of the stack variable is represented with "angr," that is, new transmission information is generated. The transmission information updated through the preprocessing of the preprocessing unit 150 may be provided to the vulnerability analysis unit 170.

The vulnerability analysis unit 170 is a component that performs a symbolic execution operation on the taint path on the basis of the taint path and the transmission information of the taint path to detect a vulnerability in the target binary file from which the taint path is provided.

When the preprocessed transmission information is received from the preprocessing unit 150, the vulnerability analysis unit 170 may perform a symbolic execution operation on the taint path on the basis of the taint path and the preprocessed transmission information of the taint path to detect a vulnerability in the target binary file from which the taint path is provided.

The vulnerability analysis unit 170 includes an execution engine 171 that performs a symbolic execution operation and a vulnerability detector 172 that detects a vulnerability in the target binary file on the basis of the result of the symbolic execution.

The execution engine 171 may perform symbolic execution on the target binary file along the taint path generated by the taint analysis unit 130 on the basis of the transmission information related to the taint path. In some embodiments, the execution engine 171 may perform symbolic execution on the taint path on the basis of the transmission information preprocessed (i.e., processed) by the preprocessing unit 150.

Symbolic execution is a binary static analysis technique in which values used in a binary file are replaced with symbols rather than concrete values to execute the binary file. The vulnerability analysis unit 170 designates an input value of the user as a symbol in the target binary file and analyzes the execution flow of the program to detect a vulnerability. The symbolic execution is similar to expanding a formula with unknown quantities in the formula.

The execution engine 171 may replace values in the target binary file with symbols to detect branching conditions based on the symbols in a conditional statement and the like included in the target binary file. The execution engine 171 may infer all paths that are actually searchable between the taint sink and the taint source using "SOLVER" and calculate the values of symbols according to each search path. One taint path may include one or more search paths.

To analyze the execution flow of the program based on the taint path through symbolic execution, the execution engine 171 may replace a specific value used in the taint source, which is the start point of the taint path, with a symbol and execute the target binary file. Here, the execution engine 171 starts a search from the end point of the taint path, that is, the taint source. In other words, the start point of a search path of the vulnerability analysis unit 170 is the end point of the taint path. Then, the execution engine 171 may calculate state information resulting from the symbolic execution of the target binary file. The state information may be expressed as the value of a symbol according to the search path. In some embodiments, the state information may include memory and register values.

In various embodiments of the present disclosure, the execution engine 171 may be configured to divide the taint path generated by the taint analysis unit 130 into blocks and calculate block-specific state information by performing a symbolic execution operation on the divided blocks. The blocks are obtained by grouping all instructions which are used in functions of a target of symbolic execution on the basis of branch points in a logical sequence. In other words, a block unit is defined as a pair of consecutive branch points in a taint path, and a block represents the path between a pair of branch points that define a corresponding block in a taint path.

In general, a developer sequentially inputs instructions of binary code, and thus instructions in the same block may be positioned in adjacent rows of the binary code. However, it is coincidental that instructions in the same block are positioned in adjacent rows, and the blocks are not to be understood herein as a grouping of adjacent instructions.

The blocks are linked together according to the logical order thereof in the target binary file. The execution engine 171 may calculate block-specific state information by searching for a taint path block by block and preserve the block-specific state information.

When symbolic execution is performed on the whole taint path without dividing the taint path into blocks, all possible paths are searched for in the event of a conditional branch during the search. Accordingly, all existing paths may be represented as "~2^(the number of branch points)."

On the other hand, the execution engine 171 does not search for some taint paths which are not included in the blocks, and thus the number of existing paths is reduced to "~2^(the number of branch points in a block)."

In various embodiments of the present disclosure, to calculate block-specific state information, the execution engine 171 may be configured to symbolize the taint path block by block and perform a symbolic execution operation on the taint path symbolized block by block.

The execution engine 171 may perform a symbolization operation of replacing a value positioned at the start point of a block with a symbol, on each block. For example, when the taint path includes a first block and a second block, the value of an instruction positioned at the start point of the first block and the value of an instruction positioned at the start point of the second block may be replaced with symbols, and a symbolic execution operation may be performed.

As a result, the execution engine 171 may calculate a set of state information of the blocks obtained by dividing the taint path as the state information of the taint path.

In some embodiments, when a search time for a block to be searched exceeds a preset threshold time or a search frequency of the block exceeds a preset threshold frequency while the block is searched along the taint path, the execution engine 171 may be further configured to stop searching the block along the taint path and continue searching the subsequent block along the taint path to calculate state information of the subsequent block. The execution engine 171 performs a symbolic execution operation on the taint path block by block. During the process, when the search time for a specific block is too long or overdetection is performed because a search path is lost at a specific block, it is determined that symbolic execution is not possible anymore in a portion of the specific block. Symbolic execution is omitted for the specific block including the portion in which symbolic execution is not possible anymore, and a symbolic execution operation is performed from the subsequent block of the specific block.

For example, when the taint path includes a first block, a second block, and a third block that are logically linked together, the execution engine 171 may be further configured to calculate state information from the first block. When a search time for the second block exceeds the preset threshold time or a search frequency of the second block exceeds the preset threshold frequency while the second block which is the subsequent block of the first block is searched along the taint path, the execution engine 171 may be further configured to stop searching the second block along the taint path and continue searching the third block along the taint path to calculate state information of the third block which is the subsequent block of the second block. Then, the analysis device 100 can reduce a very large number of search paths that are generated by repetitive statements, and even in the case of analyzing a very large function, it is possible to reach the end point of the search path in a much shorter time.

The state information resulting from the symbolic execution of the target binary file is provided to the vulnerability detector 172 and used for analyzing what kind of vulnerability the target binary file has. The execution engine 171 may provide the block-specific state information calculated through the symbolic execution to the vulnerability detector 172.

The vulnerability detector 172 may determine whether the target binary file (or the corresponding firmware) has a vulnerability. The vulnerability detector 172 may analyze a vulnerability of the target binary file from which the taint path is provided on the basis of the block-specific state information resulting from the symbolic execution instead of state information resulting from the symbolic execution of the whole target binary file.

In various embodiments of the present disclosure, to determine a vulnerability in the target binary file on the basis of the calculated state information, the vulnerability detector 172 may be configured to compare the block-specific state information resulting from the symbolic execution with at least one preset vulnerable pattern, determine whether the block-specific state information corresponds to the compared vulnerable pattern, and determine that the state information has a vulnerability of the analyzed target binary file when the block-specific state information corresponds to the vulnerable pattern. When the program state information (e.g., memory and register values and the like) of each individual block matches the compared vulnerable pattern, it is determined that the vulnerable pattern matches the state information.

The vulnerable pattern is a base for determining whether the target binary file has a vulnerability. When state information of the taint path corresponding to a vulnerable pattern (e.g., the block-specific state information of the taint path) is checked in the target binary file, the vulnerability detector 172 may determine that the target binary file has a vulnerability indicated by the corresponding vulnerable pattern. The vulnerability represents whether at least a portion of the taint path is vulnerable during a runtime.

The vulnerability detector 172 may search a vulnerable pattern list prestored in the vulnerable pattern DB 180. The vulnerable pattern DB 180 may store the vulnerable pattern list including one or more vulnerable patterns.

In various embodiments of the present disclosure, the vulnerable pattern list may be a CWE list. The CWE list may include vulnerable patterns related to CWE-identities (IDs) such as CWE-78, CWE-190, CWE-415, and the like.

As an example, the vulnerability detector 172 may detect a vulnerability of the target binary file using the vulnerable pattern of CWE-78. The vulnerable pattern of CWE-78 may be used for detecting an OS command injection attack.

The vulnerable pattern of CWE-78 represents that a user input value reaches a preset vulnerable function for executing an instruction such as a "system" function. Specifically, the vulnerability analysis unit 170 analyzes the transmission information and checks whether the taint path has a vulnerable function included in the preset vulnerable function list. To determine whether a target variable to be searched for from the start point of the taint path to the end point reaches the vulnerable function (e.g., "system," "do_system," or the like), the vulnerability analysis unit 170 registers the argument of the target variable as a symbol and checks whether the symbol or another variable referring to the symbol reaches the vulnerable function. When it is determined that the block-specific state information resulting from the symbolic execution represents that a user input value reaches a function for executing an instruction, the vulnerability detector 172 may determine that the block-specific state information corresponds to a vulnerable pattern of CWE-78, and as a result, determine that the target binary file has a vulnerability related to CWE-78.

As another example, the vulnerability detector 172 may detect a vulnerability of the target binary file using the vulnerable pattern of CWE-190. The vulnerable pattern of CWE-190 may be used for detecting integer overflows.

The vulnerable pattern of CWE-190 represents that the highest sign bit is changed. When the highest sign bit is changed, it is considered that an overflow occurs. Specifically, the vulnerability analysis unit 170 analyzes the transmission information and checks the highest sign bit of the taint path. The vulnerability detector 172 determines whether at least one sign bit in a block is changed during a runtime on the basis of the block-specific state information resulting from the symbolic execution. When it is determined that the highest sign bit is changed, the vulnerability detector 172 may determine that the block-specific state information corresponds to a vulnerable pattern of CWE-190, and as a result, determine that the target binary file has a vulnerability related to CWE-190. The vulnerability related to CWE-190 represents that an overflow occurs during the runtime of the target binary file.

As still another example, the vulnerability detector 172 may detect a vulnerability of the target binary file using the vulnerable pattern of CWE-415. The vulnerable pattern of CWE-415 may be used for detecting the double-free vulnerability.

The vulnerable pattern of CWE-415 represents that one variable is freed twice in a specific search path. Specifically, the vulnerability analysis unit 170 may search a specific path from the start point of the taint path to the end point using a dynamic memory allocation function and a dynamic memory return function. When state information resulting from the search represents that there are two frees in the specific search path, the vulnerability detector 172 may determine that the block-specific state information corresponds to the vulnerable pattern of CWE-415, and as a result, determine that the target binary file has a vulnerability related to CWE-415. The vulnerable pattern of CWE-415 represents the double-free vulnerability.

The vulnerability detector 172 may store the vulnerability analysis result in the vulnerable pattern DB 180. The vulnerability analysis result may include a vulnerability type and a vulnerability position. The vulnerability position depends on a judging criterion. The vulnerability position may be specified on the basis of the taint path. Also, in some embodiments, the vulnerability analysis result may further include the taint path of which the vulnerability analysis result is provided, the corresponding transmission information, and/or the corresponding block-specific state information. The transmission information and the block-specific state information correspond to the same taint path.

As described above, the vulnerability analysis unit 170 may analyze whether the target binary file has a vulnerability on the basis of the result of performing a symbolic execution operation on each block.

As a result, the system 1 for detecting a vulnerability has a reduced number of paths to be searched in symbolic execution. Consequently, it is possible to prevent not only path explosion, in which there are too many paths to search, during symbolic execution but also a situation in which it is difficult to perform symbolic execution in an acceptable amount of time.

Although the taint analysis unit 130, the function DB 140, the preprocessing unit 150, the vulnerability analysis unit 170, and the vulnerable pattern DB 180 are integrated in one computing device in FIG. 2, the implementation of the components 130, 140, 150, 170, and 180 is not limited thereto. The components 130, 140, 150, 170, and 180 may be configured as exclusive computing devices that are physically separated from each other, or at least some of the components 130, 140, 150, 170, and 180 may be integrated in one computing device in the form of a software module and/or a hardware module.

It is obvious to those of ordinary skill in the art that the system 1 may include other components. For example, the system 1 may include other hardware elements required for the operations described herein such as an input device for data entry and an output device for printing or other data display.

A method of analyzing a vulnerability of software installed on an IoT device according to another aspect of the present disclosure may be performed by the analysis device 100.

Figure 8:
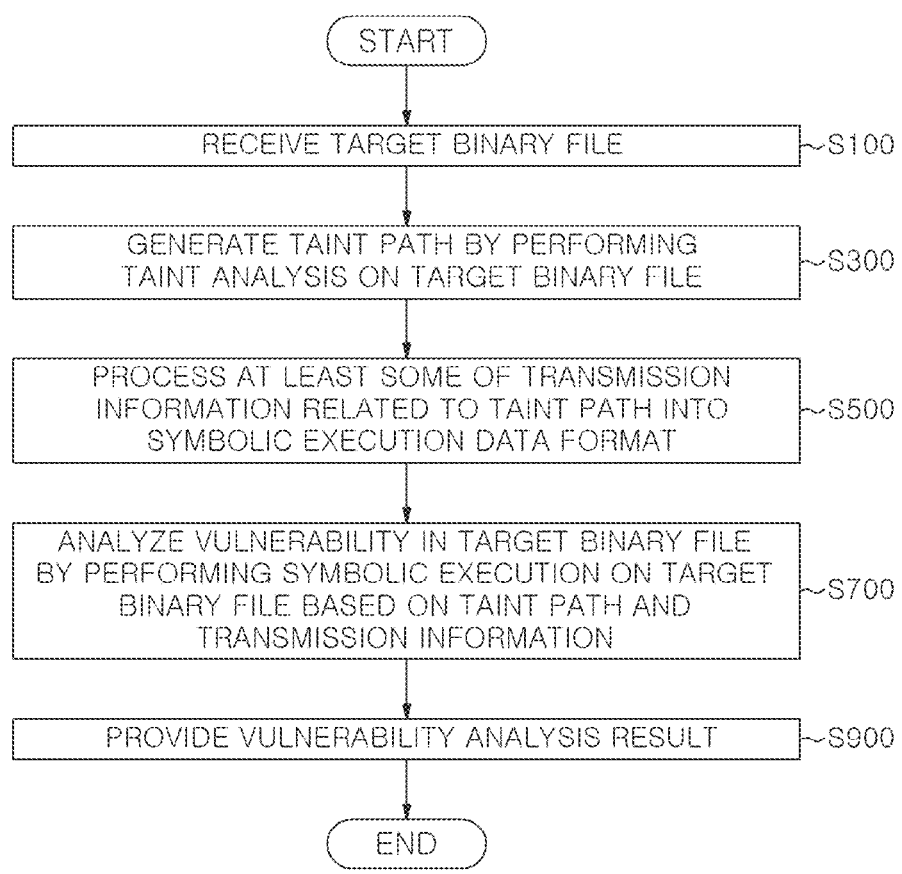
FIG. 8 is a flowchart illustrating a method of analyzing a vulnerability in software installed on an Internet of things (IoT) device according to another aspect of the present disclosure.

FIG. 8 is a flowchart illustrating a method of analyzing a vulnerability in software installed on an IoT device according to the other aspect of the present disclosure.

Referring to FIG. 8, the method includes operation S100 of acquiring a target binary file extracted from firmware of the IoT device 10 and operation S300 of generating a taint path and transmission information related to the taint path by performing taint analysis on the target binary file.

In various embodiments of the present disclosure, operation S100 may include an operation in which the user terminal 50 connected to the IoT device 10 extracts the target binary file from the firmware of the IoT device 10 and an operation in which the analysis device 100 receives the target binary file from the user terminal 50.

In operation S300, the taint path representing the propagation of a taint is generated through taint analysis. The taint path may include a user function, which may be a user input function that is an internal function of the software or a user library function based on an external library of the software. The user function may be designated as a taint source, which will be described below.

Figure 9:
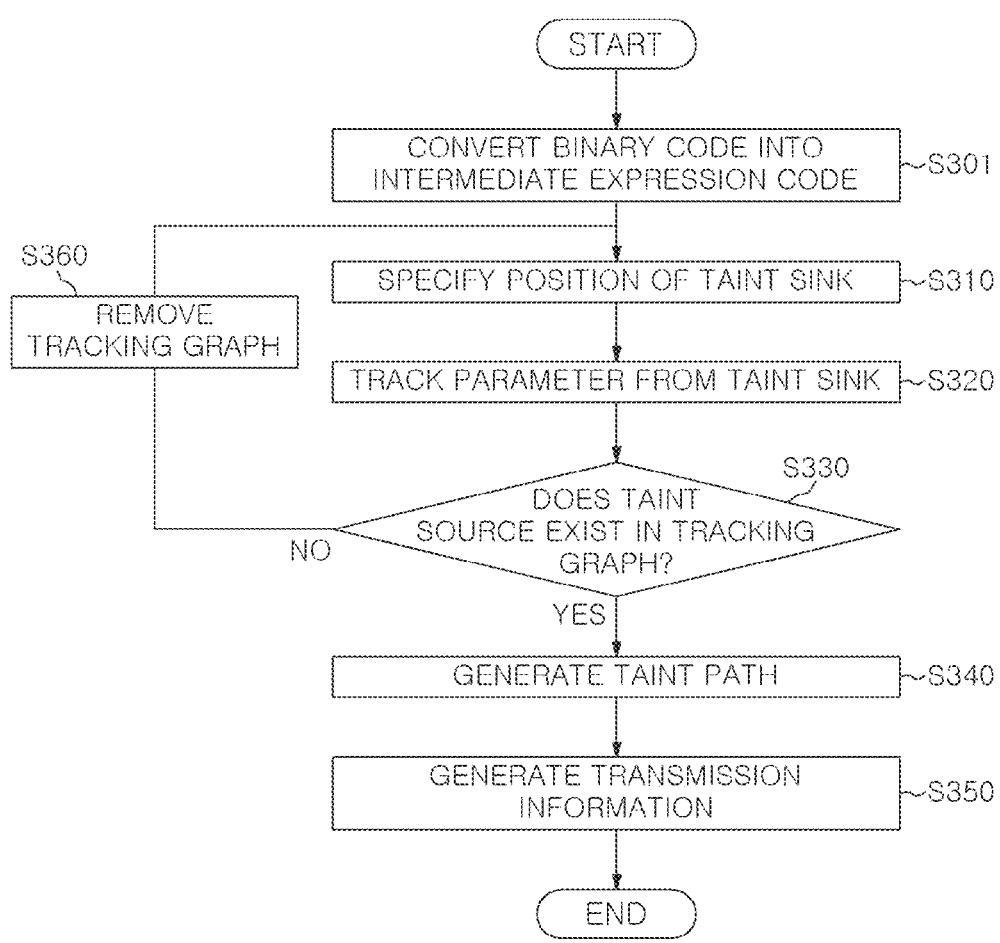
FIG. 9 is a detailed flowchart of one operation of FIG. 8 according to various embodiments of the present disclosure.

FIG. 9 is a detailed flowchart of operation S300 of FIG. 8 according to various embodiments of the present disclosure.

Referring to FIG. 9, operation S300 of generating the taint path includes operation S310 of specifying a taint sink in the target binary file, operation S320 of generating a tracking graph by tracking a parameter from the taint sink, operation S330 of determining whether a taint source is in the tracking graph and specifying a taint source corresponding to the taint sink, operation S340 of generating a taint path for the target binary file including the taint sink and the taint source, and operation S350 of generating transmission information of the taint path. Operation S300 may further include operation S360 of removing the tracking graph when it is determined that there is no taint source in the tracking graph.

In some embodiments, operation S300 may further include, before operation S310, operation S301 of converting a data expression in the original target binary file extracted from the IoT device 10 into an expression format which is preset for taint analysis.

FIG. 10 is a view of a result of converting intermediate representation code into the SSA form according to various embodiments of the present disclosure.

As shown in FIG. 10, in operation S301, the binary code of the target binary file having the original format may be converted into intermediate expression code having a data format based on the SSA form.

In operation S310, the taint sink is the start point of the taint path and may be the start point of the tracking graph. When the taint sink is specified in operation S310, the position of the taint sink in the target binary file is also specified.

In operation S310 of specifying the taint sink, when it is determined that a vulnerable function included in a prestored vulnerable function list is used in the target binary file, an instruction in which the checked vulnerable function is used may be designated as the taint sink. The position of the instruction in which the vulnerable function is used in the target binary file is designated as the position of the taint sink. As described above, the vulnerable function list prestored in the function DB 140 may include, for example, system, execl, execlp, execv, execvp, execle, execve, popen, and do_system.

Operation S320 of generating the tracking graph may include a first operation of processing the instruction corresponding to the position of the taint sink to divide the instruction into a left term and a right term, a second operation of processing one of the left and right terms including an operator to divide the left or right term into the operator and an argument, a third operation of processing the argument included in the left or right term to determine whether the argument is a variable or constant, an operation of searching, when the argument is a variable, the target binary file for at least one instruction in which the argument is used as a variable, and an operation of repeating the first operation to the third operation with each found instruction applied to the instruction analyzer to generate the tracking graph using the instruction having the argument of which analysis has been completed up to an argument level.

In the process of repeating the first operation to the third operation in operation S320, additional analysis is omitted for instructions and arguments that have already been processed. In other words, in the process of repeating the first operation to the third operation, only instructions and arguments that are not in the analysis log are processed. As a result, the taint sink may be analyzed on an instruction-by-instruction basis, an operation-by-operation basis, and an atom-by-atom basis, and parameters logically connected to the taint sink to generate the tracking graph. The tracking graph may be extended when an instruction of which analysis has been completed up to an argument level is added to the tracking graph. When an instruction related to a target of analysis has been analyzed up to an argument level, tracking in a direction related to the target of analysis may be finished in the tracking graph.

Since the process of generating a tracking graph has been described above with reference to the analyzers 132, 133, and 134, the detailed description thereof will not be repeated.

In operation S300, when a parameter is not trackable from the taint sink (S320), the analysis device 100 checks whether a taint source is included in the tracking graph that has been generated until then (S330).

A taint source specified in operation S330 may be a user function. It may be determined whether the user function exists in the tracking graph, and the user function may be designated as a taint source corresponding to the taint sink (S330). The user function may be a user input function that is an internal function of the software or a user library function based on an external library of the software.

Operation S330 of specifying the taint source may include an operation of designating the user function as the taint source corresponding to the taint sink on the basis of a call function for calling the taint sink and the tracking graph. When the taint source is specified in operation S330, the position of the taint sink in the target binary file is also specified.

In various embodiments of the present disclosure, the operation of designating the user function as the taint source corresponding to the taint sink on the basis of a call function for calling the taint sink and the tracking graph may include an operation of comparing all call instructions in the function for calling the taint sink with call instructions in the tracking graph and an operation of specifying the taint source corresponding to the taint sink on the basis of the comparison result of the call instructions.

It is checked whether the user function, that is, the taint source, is in the tracking graph by comparing the call instructions.

In some embodiments, operation S330 of may further include an operation of respecifying the taint source on the basis of a preset blacklist. Then, operation S330 may further include an operation of regenerating the taint path on the basis of the taint sink and the respecified taint source.

The operation of respecifying the taint source on the basis of the preset blacklist may include an operation of canceling the designation of the taint source when the designated taint source includes at least one function in the preset blacklist after the taint source corresponding to the taint sink is designated, an operation of determining whether the tracking graph includes a different taint source from the canceled taint source, and an operation of redesignating the different taint source as the taint source corresponding to the taint sink when it is determined that the tracking graph includes the different taint source.

As described above, the blacklist may include one or more of, for example, "abs," "acos," "asin," "printLine," "atan," "atof," "atoi," "atol," "bsearch," "calloc," "ceil," "clearerr," "cos," "cosh," "creatnew," "creattemp," "_C_Quickpool_Int," and "_close" functions as a list of functions that are not allowed to be designated as taint sources.

Whether there is another taint source may be checked on the basis of the comparison result of the call instructions as described above to initially specify a taint source.

In operation S330, when there is no taint source in the tracking graph from the beginning or a taint source is initially checked to exist and specified and then canceled on the basis of the blacklist, it is considered that no taint source exists in the tracking graph as a result. Accordingly, the tracking graph is removed and excluded from targets of symbolic execution because it is determined that no vulnerability is detected in the tracking graph.

In operation S340, a taint path including an instruction between the taint sink and the taint source may be generated using the taint sink and the taint source as the start point and the end point of the taint path, respectively.

As described above in operation S350, the transmission information including one or more of a call function of the taint sink, an address of the call function of the taint sink, a risk stage based on a taint analysis result, risk information based on the taint analysis result, an address of the taint source, an argument number of a decimal portion, an address of the taint sink, an argument number of the taint sink, and a size of the argument of the taint sink may be generated.

Figure 12:
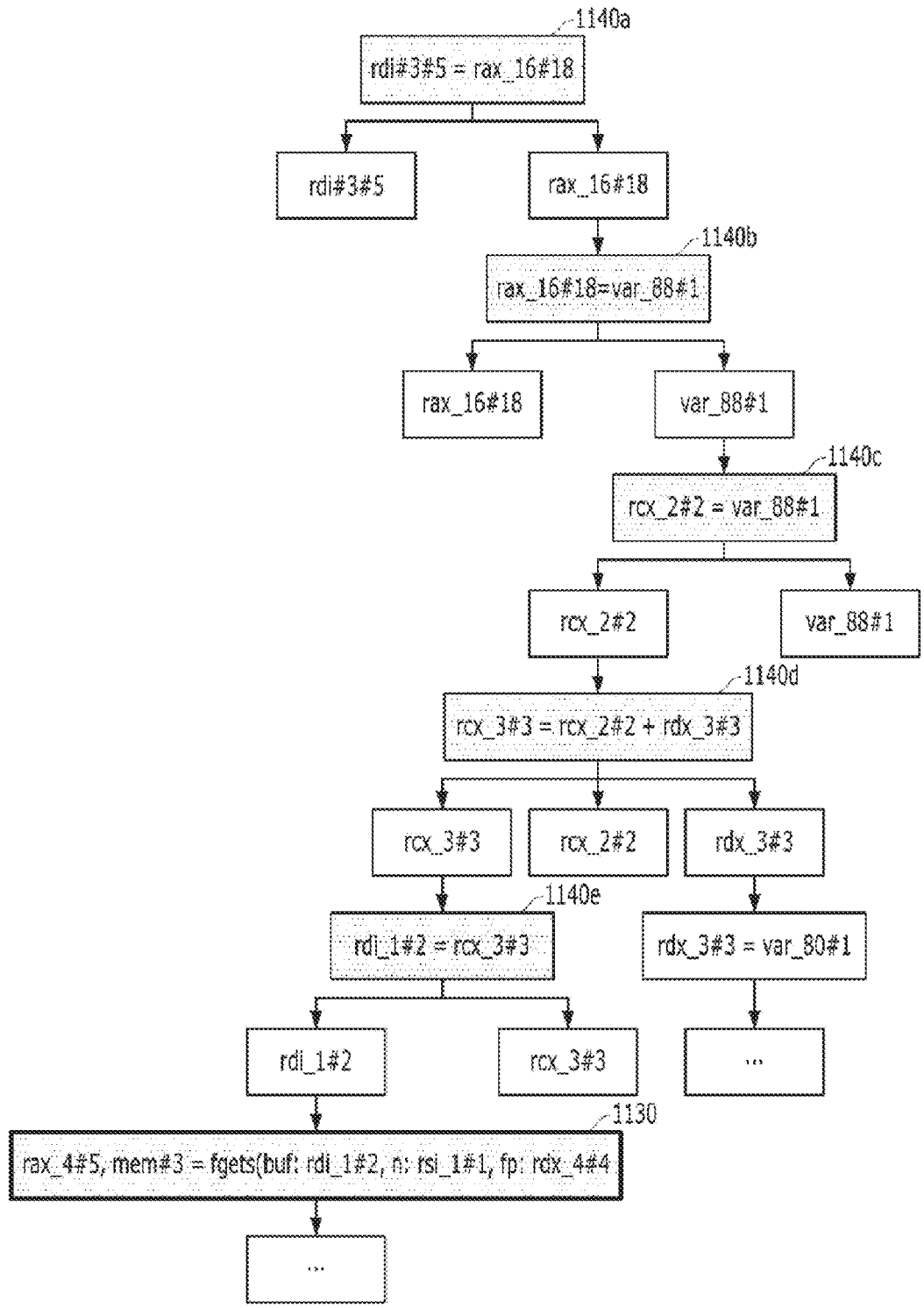
FIG. 12 is a schematic diagram illustrating a process of generating a taint graph from a tracking graph acquired from the intermediate representation code of FIG. 10.

FIG. 11 is a schematic view illustrating generation of a taint path in the intermediate representation code of FIG. 10, and FIG. 12 is a schematic diagram illustrating a process of generating a taint graph from a tracking graph acquired from the intermediate representation code of FIG. 10.

Referring to FIGS. 11 and 12, a vulnerable function 1110 ("system( )" of FIG. 11) in the binary code of FIG. 10 is designated as a taint sink (S310), and the flow of tainted data is tracked on the basis of a parameter 111 ("rdi_3 #5" of FIG. 11) to generate a tracking graph (S320). When a user input function 1130 ("fgets( )" of FIG. 11) exists in the tracking graph as a call function for calling the taint sink, the user input function 1130 is designated as a taint source (S330), and a taint path is generated in the tracking graph (S340). Then, a taint path including the taint sink 1110, the taint source 1130, and instructions 1140a to 1140e therebetween is generated. The generated taint path may be stored in the server 100.

In some embodiments, operation S350 may include an operation of generating a risk stage of the taint path on the basis of a preset whitelist and generating risk information of the taint path on the basis of the generated risk stage.

As described above, the whitelist is a list including one or more user input functions in the system 1. For example, the whitelist may include one or more user input functions among "recv," "fgetc," "fets," "fgetwc," "fscanf," "fwscanf," "fread," "read," "getc," "gets," "getch," "getche," "getchar," "getenv," "getwc," "getwchar," "scanf," "sscanf," "swscanf," and "vscanf." The whitelist may include a risk stage pre-related to each user input function.

In operation S350, it is checked whether any function in the preset whitelist matches the function designated as the taint source in the taint path, and a risk stage pre-related to the function in the whitelist matching the taint source is generated as a risk stage of the taint source included in the whitelist.

In some embodiments, before operation S700 to be described below, the method may further include operation S500 of processing at least some of the transmission information related to the taint path generated in operation S300 into a symbolic execution data format.

Operation S500 may include operations S501 and S510 of, when the taint path includes a stack variable, calculating the size of the stack variable and adding the size information of the stack variable to the transmission information of the taint path, operations S521 to S527 of determining the data type of the stack variable and adding the data type to the transmission information, and an operation of converting at least some of the transmission information including the size information and the data type into the symbolic execution data format.

The symbolic execution data format may be, for example, the JSON format, but is not limited thereto. Final transmission information obtained by converting the data format includes the size information and the data type.

Figure 13:
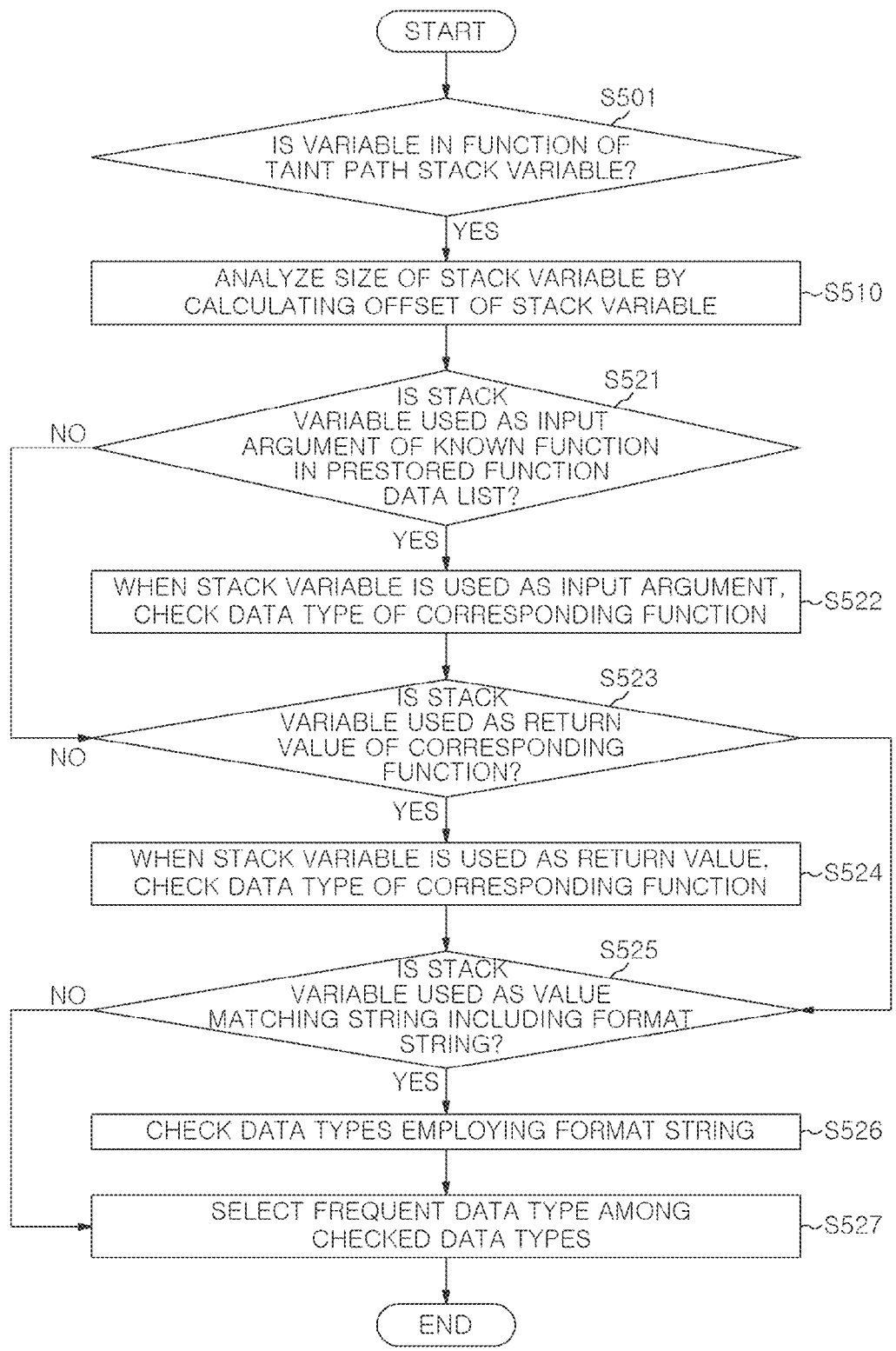
FIG. 13 is a detailed flowchart of one operation of FIG. 8 according to various embodiments of the present disclosure.

FIG. 13 is a detailed flowchart of operation S500 of FIG. 8 according to various embodiments of the present disclosure.

Referring to FIG. 13, operation S500 includes operation S501 of determining whether variables in functions of the taint path of the target binary file include a stack variable. When the taint path includes a stack variable, processing operations S510 to S527 may be performed.

Operation S500 includes operation S510 of analyzing the size of the stack variable in the taint path. Operation S510 may include an operation of calculating the size of the stack variable on the basis of the offset of the stack variable in the target binary file and an operation of processing the expression data of the stack variable in the transmission information into a preset data format on the basis of the calculated size of the stack variable.

In operation S510, the operation of calculating the size of the stack variable in the taint path on the basis of the offset of the stack variable may include an operation of calculating the offset between a stack variable in the taint path and another variable at a position next to the position of the stack variable in the target binary file.

Also, in some embodiments, operation S500 may further include operation S520 of analyzing the data type of the stack variable in at least one of the argument aspect, the return value aspect, and the format string aspect of a function and determining the data type of the stack variable. Specifically, operation S520 may include operation S521 of determining whether the stack variable is an argument which is input to a function in a prestored function data list to analyze the data type of the stack variable in the argument aspect of a function, operation S522 of determining, when the stack variable is checked as an argument which is input to a function in the prestored function data list, the data type of an argument related to the function (i.e., the function to which the checked argument is input) in the function data list as the data type of the stack variable, operation S523 of determining whether the stack variable is a return value which is input to a function in the prestored function data list to analyze the data type of the stack variable in the return value aspect of a function, operation S524 of determining, when the stack value is checked as a return value which is input to a function in the prestored function data list, the data type of the return value related to the function in the function data list as the data type of the stack variable, and an operation of determining, when the data type of the stack variable is not determined in the argument aspect and the return value aspect, the data type of the stack variable in the format string aspect. In some embodiments, the operation of determining the data type of the stack variable in the format string aspect may include operation S525 of searching for a string having a format string among strings used in the target binary file and determining whether a string including a format string is used in the range of a function to which the stack variable is input and operation S526 of matching, when it is determined that a string including a format string is used in the range of a function to which the stack variable is input, the format string used in the string to the stack variable to determine the data type of the stack variable.

In some embodiments, operation S520 may further include operation S527 of determining, when it is checked in operation S525 that no string including a format string is used in the range of a function to which the stack variable is input, the most frequent one of checked data types as the data type of the stack variable.

The size information and data type of the variable obtained through operations S501 to S527 may be included in the transmission information of which the data format has been converted, and used for a symbolic execution operation in operation S700.

In addition, the method may include operation S700 of performing symbolic execution on the target binary file on the basis of the taint path and the transmission information to analyze a vulnerability in the target binary file.

Figure 14:
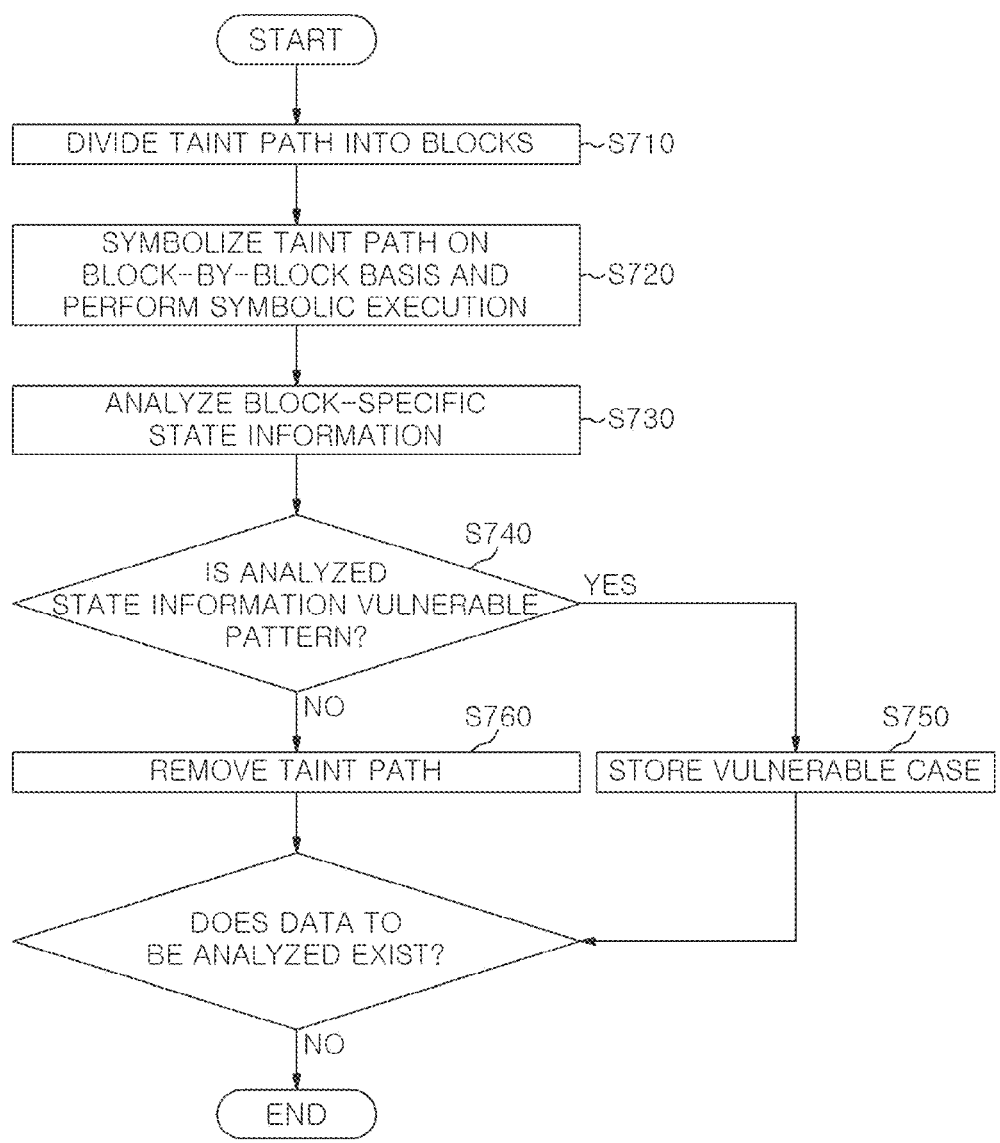
FIG. 14 is a detailed flowchart of another operation of FIG. 8 according to various embodiments of the present disclosure.

FIG. 14 is a detailed flowchart of operation S700 of FIG. 8 according to various embodiments of the present disclosure.

Referring to FIG. 14, operation S700 may include operation S710 of dividing the taint path generated by the taint analysis unit 130 into blocks before a symbolic execution operation, operation S720 of performing symbolic execution on the taint path generated by the taint analysis unit 130 block by block on the basis of the transmission information related to the taint path to calculate state information of each block in the taint path, and operation S730 of analyzing the block-specific state information to determine a vulnerability of the target binary file.

In operation S710, the taint path may be divided into blocks by defining the intervals between branch points in the taint path as blocks, and state information of the divided blocks may be calculated.

Figure 15:
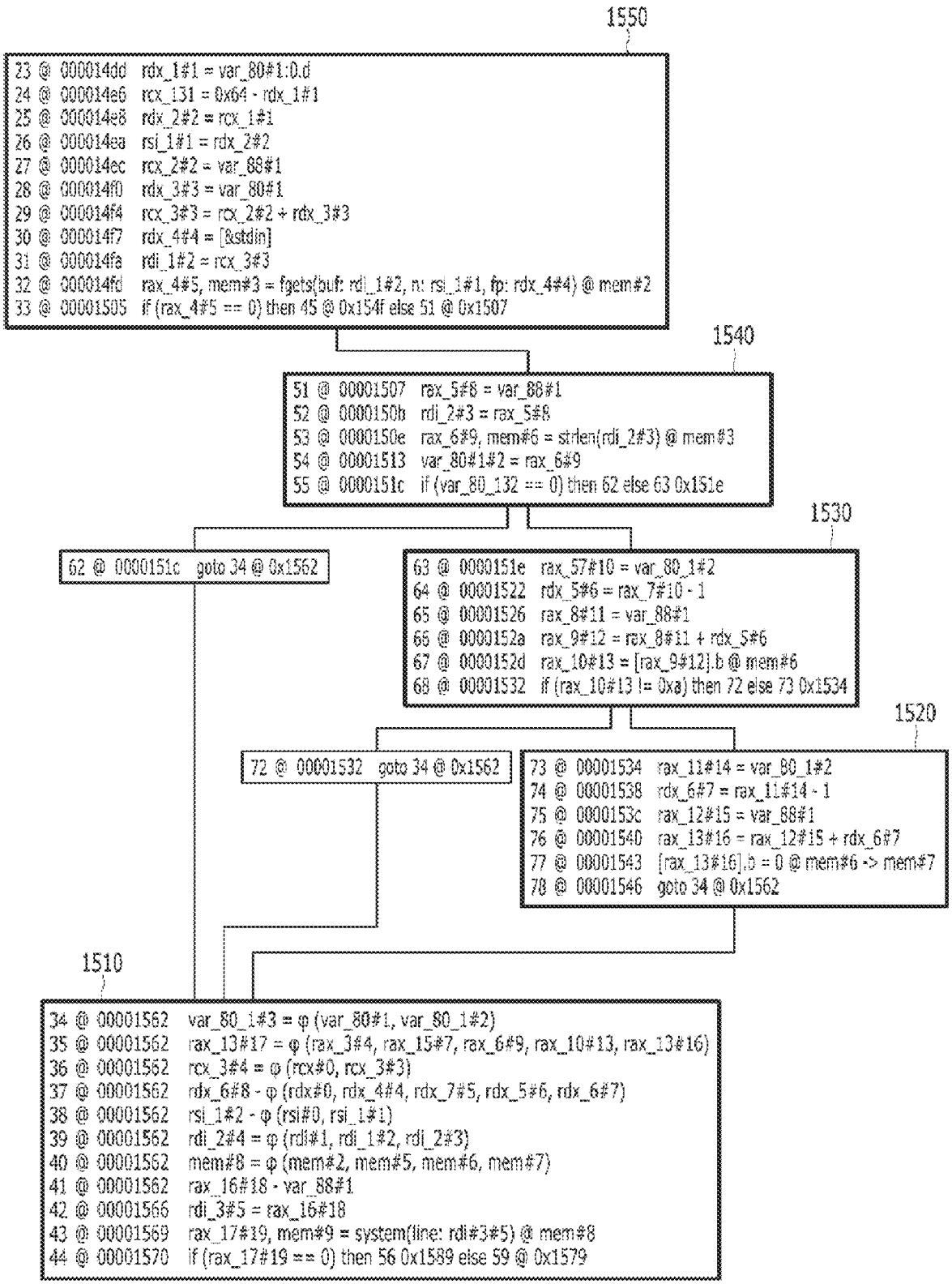
FIG. 15 is a schematic view of a result of dividing a taint path into blocks according to various embodiments of the present disclosure.

FIG. 15 is a schematic view of a result of dividing a taint path into blocks according to various embodiments of the present disclosure.

The entire taint path of FIG. 15 includes the taint path of FIG. 11.

Referring to FIG. 15, blocks 1510 to 1550 may be formed by dividing the taint path into blocks. The block 1510 includes $34^{th}$ to $44^{th}$ lines of FIG. 11, and the block 1550 includes $23^{rd}$ to $33^{rd}$ lines of FIG. 11. Although not shown in FIG. 11, the blocks 1520, 1530, and 1540 are formed on the basis of binary code included in the target binary file.

In various embodiments of the present disclosure, operation S720 may include an operation of replacing a value at a start point of a block with a symbol to symbolize the taint path block by block and an operation of performing a symbolic execution operation on the taint path symbolized block by block.

State information generated in operation S720 may be stored in the server 100. In some embodiments, the state information may include memory and register values.

According to some embodiments, in the operation of performing a symbolic execution operation on the taint path symbolized block by block in operation S720, when the search time for the block to be searched exceeds a preset threshold time or the search frequency of the block exceeds a preset threshold frequency while the block is searched along the taint path, searching the block along the taint path may be stopped, and searching the subsequent block along the taint path may continue to calculate the state information of the subsequent block. For example, the taint path may include a first block, a second block, and a third block that are logically linked together in sequence. Here, state information is calculated from the first block, and when the search time for the second block exceeds the preset threshold time or the search frequency of the second block exceeds the preset threshold frequency while the second block which is next to the first block is searched along the taint path, searching the second block along the taint path may be stopped, and searching the third block along the taint path may continue to calculate the state information of the third block which is next to the second block.

Also, operation S700 includes operation S740 of determining whether the block-specific state information calculated as an analysis result through the symbolic execution in operation S730 corresponds to a vulnerable pattern and operation S750 of determining that the target binary file of which the state information has been analyzed has a vulnerability when the block-specific state information corresponds to the vulnerable pattern.

In operation S740, the block-specific state information resulting from the symbolic execution may be compared with at least one preset vulnerable pattern, and it may be checked whether the block-specific state information corresponds to the compared vulnerable pattern on the basis of the comparison result. When the program state information of each individual block matches a compared vulnerable pattern, it is determined that the vulnerable pattern matches the state information.

When it is determined in operation S750 that the target binary file has a vulnerability, block-specific state information that causes the determination may be stored in the vulnerable pattern DB 180 as a vulnerable case.

In various embodiments of the present disclosure, the vulnerable pattern may be a vulnerable pattern related to CWE-IDs. For example, the vulnerable pattern may be CWE-78, CWE-190, CWE-415, or the like.

In various embodiments of the present disclosure, operation S740 may include an operation of determining whether the block-specific state information resulting from the symbolic execution corresponds to a first vulnerable pattern indicating a first vulnerability, an operation of determining whether the block-specific state information resulting from the symbolic execution corresponds to a second vulnerable pattern indicating a second vulnerability, and/or an operation of determining whether the block-specific state information resulting from the symbolic execution corresponds to a third vulnerable pattern indicating a third vulnerability.

In operation S750, the target binary file may be determined to have a vulnerability that has been checked to correspond in operation S740.

The operation of determining whether the block-specific state information resulting from the symbolic execution corresponds to the first vulnerable pattern indicating the first vulnerability may include an operation of registering the argument of a target variable to be searched for as a symbol to determine whether the target variable from the start point of the taint path to the end point reaches a preset vulnerable function (e.g., "system," "do_system," or the like), an operation of determining whether the symbol or another variable referring to the symbol reaches the vulnerable function, and an operation of determining, when it is determined that the block-specific state information resulting from the symbolic execution represents that a user input value reaches a function for executing an instruction, that the block-specific state information corresponds to the first vulnerable pattern (e.g., the vulnerable pattern of CWE-78) indicating the first vulnerability. The preset vulnerable function is a function included in the vulnerable function list.

When the block-specific state information is determined to correspond to the first vulnerable pattern (S740), the target binary file is determined to have the first vulnerability (S750).

The operation of determining whether the block-specific state information resulting from the symbolic execution corresponds to the second vulnerable pattern indicating the second vulnerability may include an operation of determining whether a sign bit in the block is changed during a runtime on the basis of the block-specific state information resulting from the symbolic execution and an operation of determining that the block-specific state information corresponds to the second vulnerable pattern indicating the second vulnerability when it is determined that a highest sign bit is changed. When the block-specific state information is determined to correspond to the second vulnerable pattern (S740), the target binary file is determined to have the second vulnerability (S750). The second vulnerability represents that an overflow occurs during the runtime of the target binary file.

The operation of determining whether the block-specific state information resulting from the symbolic execution corresponds to the third vulnerable pattern indicating the third vulnerability may include an operation of searching a specific path from the start point of the taint path to the end point using a dynamic memory allocation function and a dynamic memory return function and an operation of determining that the block-specific state information corresponds to the third vulnerable pattern (e.g., the vulnerable pattern of CWE-415) indicating the third vulnerability when state information resulting from the search represents that there are two frees in the specific search path. When the block-specific state information is determined to correspond to the third vulnerable pattern (S740), the target binary file is determined to have the third vulnerability (S750). The third vulnerability represents the double-free vulnerability.

In addition, operation S700 includes an operation S760 of removing the taint path when no vulnerable pattern is checked to correspond to the block-specific state information. When there is no data to be additionally analyzed after operations S750 and S760, the vulnerability detection operation is finished.

The system 1 and method for detecting a vulnerability in a program installed on an IoT device can automatically examine a vulnerability on the basis of a static binary analysis method without executing a program of the IoT device, and thus it is possible to not depend on an execution environment. Also, the vulnerability detection system may include any external function, which is implemented in the form of a library by a developer, as a target of analysis, which allows more universal analysis.

According to embodiments of the present disclosure, vulnerabilities can be automatically examined on the basis of a static binary analysis method without executing a program of an IoT device, and thus it is possible to not depend on an execution environment.

Also, the vulnerability detection system may include any external function, which is implemented in the form of a library by a developer, as a target of analysis, which allows more universal analysis.

According to embodiments, it is possible to prevent not only path explosion, in which there are too many paths to search, during symbolic execution but also a situation in which it is difficult to perform symbolic execution in an acceptable amount of time. As a result, it is possible to increase examination efficiency during the same examination time compared to other examination methods.

When embodiments of the present disclosure are implemented using hardware, application-specific integrated circuits (ASICs), digital signal processors (DSPs), digital signal processing devices (DSPDs), programmable logic devices (PLDs), field programmable gate arrays (FPGAs), or the like configured to perform the present disclosure may be included in the processor of the present disclosure.

Meanwhile, the foregoing method can be implemented as a program executable in a computer and executed in a general-use digital computer that executes the program using a computer-readable medium. The structure of data used in the foregoing method may be recorded on a computer-readable storage medium in various ways. It should be understood that program storage devices that may be used for describing a storage device including executable computer code for performing various methods of the present disclosure do not include temporary objects such as carrier waves or signals. The computer-readable storage medium includes a storage medium such as a magnetic storage medium (e.g., a read-only memory (ROM), a floppy disk, a hard disk, or the like) or an optical medium (e.g., a compact disc (CD)-ROM, a digital versatile disc (DVD), or the like).

The embodiments described above are constructed by combining components and features of the present disclosure in certain forms. Each component or feature should be considered selective unless explicitly mentioned otherwise. Each component or feature may be implemented without being combined with other components or features. In addition, some components and/or features may be combined in an embodiment of the present disclosure. The sequences of operations described in embodiments of the present disclosure may be changed. Some elements or features of an embodiment may be included in another embodiment or replaced by corresponding elements or features of another embodiment. It is obvious that claims not explicitly recited may be combined into an embodiment or included as a new claim by amendment after filing.

Those skilled in the art will appreciate that the present disclosure may be implemented in other specific forms without departing from the technical spirit or essential features thereof. Therefore, the above embodiments are to be construed as illustrative rather than restrictive in all aspects. The scope of the present disclosure should be determined by a reasonable interpretation of the appended claims and all possible variations within the scope of the present disclosure or an equivalent thereof.

One or more of the embodiments described herein can be combined in whole or in part with the embodiments described in co-pending U.S. Patent Application Ser. Nos. 18/673,062, entitled "SYSTEM AND METHOD FOR ANALYZING CONTAMINATION PATHS TO ANALYZE VULNERABILITIES IN IoT DEVICES," and 18/673,066, entitled "SYSTEM AND METHOD FOR ANALYZING VULNERABILITIES IN IoT DEVICES THROUGH PRE-PROCESSING IDENTIFICATION INFORMATION OF CONTAMINATION PATHS," filed on even date herewith. For instance, embodiments of the aforementioned U.S. applications can be combined in whole or in part with embodiments of the subject disclosure. For example, one or more features and/or embodiments described in the aforementioned U.S. applications can be used in conjunction with (or as a substitute for) one or more features and/or embodiments described herein, and vice versa. Accordingly, all sections of each of the aforementioned U.S. applications are incorporated herein by reference in their entirety.

What is claimed is:

1. A method of analyzing a vulnerability in software installed on an Internet of things (IoT) device, which is performed by a vulnerability analysis device, the method comprising:
   acquiring a target binary file extracted from firmware of an IoT device;
   generating a taint path and transmission information related to the taint path by performing taint analysis on the target binary file; and
   detecting a vulnerability in the target binary file by performing symbolic execution on the target binary file on the basis of the taint path and the transmission information,
   wherein the taint path includes a user function, including a user input function that is an internal function of the software or a user library function based on an external library of the software, and
   wherein the detecting of the vulnerability in the target binary file by performing the symbolic execution on the target binary file further comprises:
   dividing the generated taint path into blocks;
   performing symbolic execution on the generated taint path on a block-by-block basis based on the transmission information related to the taint path to calculate state information of each block of the taint path;
   analyzing block-specific state information to determine the vulnerability of the target binary file;
   comparing the block-specific state information resulting from the symbolic execution with at least one preset vulnerable pattern to determine whether the block-specific state information corresponds to the compared preset vulnerable pattern; and
   when the block-specific state information corresponds to the compared preset vulnerable pattern, determining that the target binary file of which the state information has been analyzed has the vulnerability.

2. The method of claim 1, wherein the generating of the taint path and the transmission information related to the taint path comprises:
   specifying a taint sink in the target binary file;
   generating a tracking graph by tracking a parameter from the taint sink;
   determining whether the user function is in the tracking graph and designating the user function as a taint source corresponding to the taint sink;
   generating a taint path for the target binary file including the taint sink and the taint source; and
   generating transmission information of the taint path.

3. The method of claim 2, wherein the generating of the taint path and the transmission information related to the taint path further comprises, upon the determination of no taint source in the tracking graph, removing the tracking graph.

4. The method of claim 2,
   wherein the specifying of the taint sink in the target binary file comprises, when it is determined that a vulnerable function included in a prestored vulnerable function list is used in the target binary file, designating an instruction in which the determined vulnerable function is used as a taint sink.

5. The method of claim 2,
   wherein the generating of the tracking graph by tracking the parameter from the taint sink comprises:
   a first operation of processing an instruction corresponding to a position of the taint sink to divide the instruction into a left term and a right term;
   a second operation of processing one of the left term and right term including an operator to divide the left term or right term into the operator and an argument;
   a third operation of processing the argument included in the left term or right term to determine whether the argument is a variable or constant;
   an operation of searching, when the argument is a variable, the target binary file for at least one instruction in which the argument is used as the variable; and
   an operation of repeating the first operation to the third operation on each found instruction to generate the tracking graph using the instruction having the argument of which analysis has been completed up to an argument level.

6. The method of claim 2, wherein the determining of whether the user function is in the tracking graph and the designating of the user function as the taint source corresponding to the taint sink comprises:
   designating the user function as the taint source corresponding to the taint sink on the basis of a call function for calling the taint sink and the tracking graph by comparing all call instructions in a function for calling the taint sink with call instructions in the tracking graph; and
   specifying the taint source corresponding to the taint sink on the basis of a comparison result of the call instructions.

7. The method of claim 6,
   wherein the determining of whether the user function is in the tracking graph and the designating of the user function as the taint source corresponding to the taint sink further comprises:
   when the designated taint source includes at least one function in a preset blacklist after the taint source corresponding to the taint sink is designated, canceling designation of the taint source;
   determining whether the tracking graph includes a different taint source from the canceled taint source;

when it is determined that the tracking graph includes the different taint source, redesignating the different taint source as the taint source corresponding to the taint sink; and regenerating the taint path on the basis of the taint sink and the redesignated taint source.

8. The method of claim 1, wherein the transmission information includes one or more of a call function of a taint sink, an address of the call function of the taint sink, a risk stage based on a result of the taint analysis, risk information based on the result of the taint analysis, an address of a taint source, an argument number of a decimal portion, an address of the taint sink, an argument number of the taint sink, and a size of an argument of the taint sink, and the generating of the transmission information related to the taint path comprises generating a risk stage for the taint path on the basis of a preset whitelist and generating risk information of the taint path on the basis of the generated risk stage to generate the risk stage and the risk information in the transmission information.

9. The method of claim 1, wherein the performing of the symbolic execution on the generated taint path on a block-by-block basis comprises:

replacing a value at a start point of a block with a symbol to symbolize the taint path on a block-by-block basis; and performing a symbolic execution operation on the taint path symbolized on a block-by-block basis.

10. The method of claim 9, wherein the performing of the symbolic execution operation on the taint path symbolized on a block-by-block basis comprises, when a search time for the block to be searched exceeds a preset threshold time or a search frequency of the block exceeds a preset threshold frequency while the block is searched along the taint path, stopping searching the block along the taint path and continuing searching a subsequent block along the taint path to calculate state information of the subsequent block.

11. The method of claim 1, wherein the comparing of the block-specific state information resulting from the symbolic execution with the at least one preset vulnerable pattern to determine whether the block-specific state information corresponds to the compared preset vulnerable pattern comprises:

registering an argument for a target variable as a symbol to determine whether the target variable to be searched for from a start point of the taint path to an end point reaches a preset vulnerable function;

determining whether the symbol or another variable referring to the symbol reaches the preset vulnerable function; and when it is determined that the block-specific state information resulting from the symbolic execution represents that a user input value reaches a function for executing an instruction, determining that the block-specific state information corresponds to a first vulnerable pattern indicating a first vulnerability.

12. The method of claim 11, wherein the comparing of the block-specific state information resulting from the symbolic execution with the at least one preset vulnerable pattern to determine whether the block-specific state information corresponds to the compared preset vulnerable pattern further comprises:

determining whether a sign bit of at least one variable in the block is changed during a runtime on the basis of the block-specific state information resulting from the symbolic execution; and if it is determined that a highest sign bit is changed, determining that the block-specific state information corresponds to a second vulnerable pattern indicating a second vulnerability.

13. The method of claim 12, wherein the comparing of the block-specific state information resulting from the symbolic execution with the at least one preset vulnerable pattern to determine whether the block-specific state information corresponds to the compared preset vulnerable pattern further comprises:

searching a specific path from the start point of the taint path to the end point using a dynamic memory allocation function and a dynamic memory return function; and when state information resulting from the search represents that there are two frees in the specific search path, determining that the block-specific state information corresponds to a third vulnerable pattern indicating a third vulnerability.

14. A non-transitory, computer-readable recording medium on which a program for performing the method of analyzing a vulnerability in software installed on an Internet of things (IoT) device according to claim 1 is recorded.

15. A vulnerability analysis device for analyzing a vulnerability in software installed on an Internet of things (IoT) device, the vulnerability analysis device comprising:

a communication unit configured to acquire a target binary file extracted from firmware of the IoT device;

a taint analysis unit configured to generate a taint path by performing taint analysis on the target binary file and generate transmission information related to the taint path; and a vulnerability analysis unit configured to detect a vulnerability in the target binary file by performing symbolic execution on the target binary file on the basis of the taint path and the transmission information, wherein, to perform symbolic execution on the target binary file and analyze the vulnerability of the target binary file, the vulnerability analysis unit is further configured to:

divide the generated taint path into blocks, perform symbolic execution on the generated taint path on a block-by-block basis based on the transmission information related to the taint path to calculate state information of each block of the taint path;

analyze block-specific state information to determine the vulnerability of the target binary file;

compare the block-specific state information resulting from the symbolic execution with at least one preset vulnerable pattern to determine whether the block-specific state information corresponds to the compared preset vulnerable pattern; and when the block-specific state information corresponds to the compared preset vulnerable pattern, determines that the target binary file of which the state information has been analyzed has the vulnerability.

16. The vulnerability analysis device of claim 15, wherein the taint analysis unit includes an instruction analyzer, an operation analyzer, and an atom analyzer to generate a tracking graph, the instruction analyzer processes the target binary file on an instruction-by-instruction basis to divide a processed instruction into a left term and a right term, transmits one of the divided left and right terms including an operator to the operation analyzer, and transmits the other of the divided left and right terms including no operator to the atom analyzer, the operation analyzer processes the left term or right term on an operation-by-operation basis to determine whether a left-or right-term component is an operator and transmits a term component which is not an operator to the atom analyzer, and the atom analyzer processes an argument in the processed instruction on an atom-by-atom basis to classify the argument as a variable or constant.

\* \* \* \* \*